United States Patent [19]
Hecht et al.

[11] Patent Number: 6,000,621
[45] Date of Patent: *Dec. 14, 1999

[54] TILINGS OF MONO-CODE AND DUAL-CODE EMBEDDED DATA PATTERN STRIPS FOR ROBUST ASYNCHRONOUS CAPTURE

[75] Inventors: David L. Hecht, Palo Alto; Glen W. Petrie, Los Gatos, both of Calif.

[73] Assignee: Xerox Corporation, Stamford, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/576,630

[22] Filed: Dec. 21, 1995

[51] Int. Cl.⁶ .................................................. G06K 07/10
[52] U.S. Cl. ...................... 235/494; 235/487; 235/462.1
[58] Field of Search ........................... 382/243; 235/494, 235/487, 456, 454, 462, 462.01, 462.1

[56] References Cited

U.S. PATENT DOCUMENTS

| | | | |
|---|---|---|---|
| 4,263,504 | 4/1981 | Thomas | 235/454 |
| 4,662,651 | 5/1987 | Mowry, Jr. | 283/70 |
| 4,716,438 | 12/1987 | Farrell | 355/6 |
| 4,728,984 | 3/1988 | Daniele | 355/6 |
| 4,757,348 | 7/1988 | Rourke et al. | 355/6 |
| 4,786,940 | 11/1988 | Daniele | 355/6 |
| 4,814,594 | 3/1989 | Drexler | 235/487 |
| 4,970,554 | 11/1990 | Rourke | 355/202 |
| 5,060,980 | 10/1991 | Johnson et al. | 283/70 |
| 5,091,966 | 2/1992 | Bloomberg et al. | 235/494 |
| 5,128,525 | 7/1992 | Stearns et al. | 235/454 |
| 5,157,726 | 10/1992 | Merkle et al. | 380/23 |
| 5,168,147 | 12/1992 | Bloomberg | 235/456 |
| 5,221,833 | 6/1993 | Hecht | 235/494 |
| 5,245,165 | 9/1993 | Zhang | 235/454 |
| 5,278,400 | 1/1994 | Appel | 235/494 |
| 5,315,098 | 5/1994 | Tow | 235/494 |
| 5,317,646 | 5/1994 | Sang, Jr. et al. | 382/9 |
| 5,411,799 | 5/1995 | Loving | 428/343 |
| 5,416,311 | 5/1995 | Kyriazis | 235/494 |
| 5,444,779 | 8/1995 | Daniele | 380/3 |
| 5,448,375 | 9/1995 | Cooper et al. | 358/403 |
| 5,449,895 | 9/1995 | Hecht et al. | 235/494 |
| 5,449,896 | 9/1995 | Hecht et al. | 235/494 |
| 5,453,605 | 9/1995 | Hecht et al. | 235/494 |
| 5,481,103 | 1/1996 | Wang | 235/494 |
| 5,486,686 | 1/1996 | Zdybel, Jr. et al. | 235/375 |
| 5,489,763 | 2/1996 | Conrad et al. | 235/384 |
| 5,521,372 | 5/1996 | Hecht et al. | 235/494 |
| 5,537,223 | 7/1996 | Curry | 358/460 |
| 5,572,010 | 11/1996 | Petrie | 235/494 |
| 5,576,532 | 11/1996 | Hecht | 235/494 |
| 5,611,575 | 3/1997 | Petrie | 283/67 |
| 5,631,686 | 5/1997 | Castelli et al. | 347/133 |
| 5,682,540 | 10/1997 | Klotz, Jr. et al. | 395/766 |
| 5,684,885 | 11/1997 | Cass et al. | 382/100 |
| 5,694,102 | 12/1997 | Hecht | 235/456 |
| 5,706,099 | 1/1998 | Curry | 358/298 |
| 5,717,197 | 2/1998 | Petrie | 235/494 |
| 5,761,686 | 6/1998 | Bloomberg | 707/529 |
| 5,765,176 | 6/1998 | Bloomberg | 707/514 |
| 5,771,245 | 6/1998 | Zhang | 371/39.1 |
| 5,866,895 | 2/1999 | Fukuda et al. | 235/494 |

*Primary Examiner*—Donald Hajec
*Assistant Examiner*—Mark Tremblay

[57] ABSTRACT

To facilitate the recovery data from an embedded data pattern through the use of a appropriately sized capture window that is randomly positioned within the data pattern, the embedded data pattern is composed of a plurality of identical, one dimensionally or two dimensionally regularly tiled embedded data blocks which contain sufficient spatial addressing information to permit the logical reconstruction of a complete data block from any set of fragments that collectively provide a full cover for the surface area of any one tile. To this end, the capture window is sized to include a shape which is completely registered with the data pattern in which is capable of tiling the recording medium in accordance with the tiling vectors.

46 Claims, 24 Drawing Sheets

```
A57 A58 B51 B52 B53 B54 B55 B56 V09 B57 B58 Y04 A51 A52 A53 A54 A55 A56
A67 A68 B61 B62 B63 B64 B65 B66 K14 B67 B68 K10 A61 A62 A63 A64 A65 A66
A77 A78 B71 B72 B73 B74 B75 B76 V08 B77 B78 Y05 A71 A72 A73 A74 A75 A76
A87 A88 B81 B82 B83 B84 B85 B86 V07 B87 B88 Y06 A81 A82 A83 A84 A85 A86
D17 D18 E11 E12 E13 E14 E15 E16 K15 E17 E18 K11 D11 D12 D13 D14 D15 D16
D27 D28 E21 E22 E23 E24 E25 E26 V06 E27 E28 Y07 D21 D22 D23 D24 D25 D26
D37 D38 E31 E32 E33 E34 E35 E36 V05 E37 E38 Y08 D31 D32 D33 D34 D35 D36
D47 D48 E41 E42 E43 E44 E45 E46 K16 E47 E48 K12 D41 D42 D43 D44 D45 D46
D57 D58 E51 E52 E53 E54 E55 E56 V04 E57 E58 Y09 D51 D52 D53 D54 D55 D56
D67 D68 E61 E62 E63 E64 E65 E66 V03 E67 E68 Y10 D61 D62 D63 D64 D65 D66
U08 U07 K07 U06 U05 K08 U04 U03 K00 U02 U01 K00 U12 U11 K05 U10 U09 K06
D77 D78 E71 E72 E73 E74 E75 E76 V02 E77 E78 Y11 D71 D72 D73 D74 D75 D76
D87 D88 E81 E82 E83 E84 E85 E86 V01 E87 E88 Y12 D81 D82 D83 D84 D85 D86
X05 X06 K03 X07 X08 K04 X09 X10 K00 X11 X12 K00 X01 X02 K01 X03 X04 K02
A17 A18 B11 B12 B13 B14 B15 B16 V12 B17 B18 Y01 A11 A12 A13 A14 A15 A16
A27 A28 B21 B22 B23 B24 B25 B26 V11 B27 B28 Y02 A21 A22 A23 A24 A25 A26
A37 A38 B31 B32 B33 B34 B35 B36 K13 B37 B38 K09 A31 A32 A33 A34 A35 A36
A47 A48 B41 B42 B43 B44 B45 B46 V10 B47 B48 Y03 A41 A42 A43 A44 A45 A46
```

Tile Shaped
Capture Window

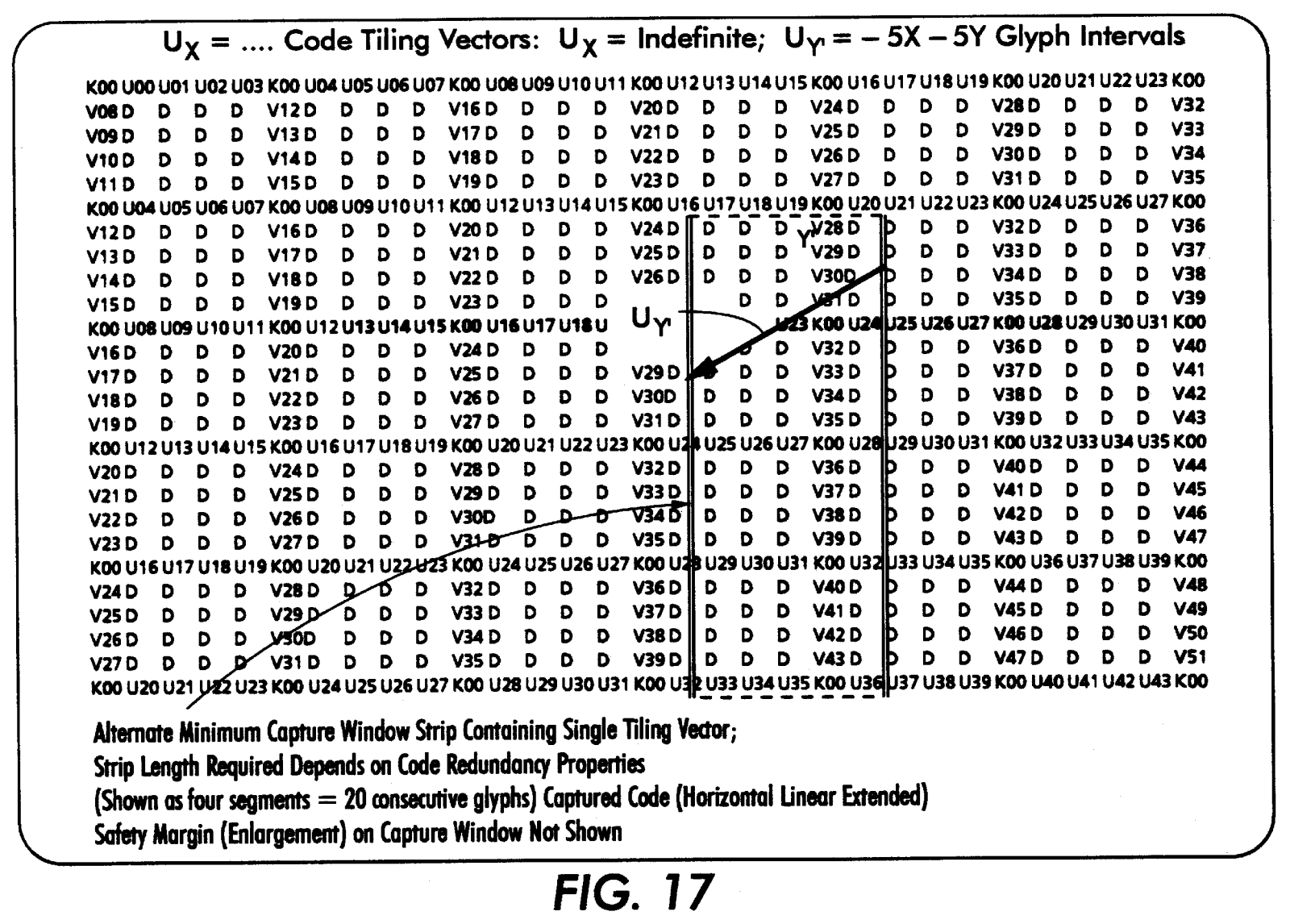

$U_X = $ .... Code Tiling Vectors: $U_X = $ Indefinite; $U_Y = -5X - 5Y$ Glyph Intervals

FIG. 17

Alternate Minimum Capture Window Strip Containing Single Tiling Vector;
Strip Length Required Depends on Code Redundancy Properties
(Shown as four segments = 20 consecutive glyphs) Captured Code (Horizontal Linear Extended)
Safety Margin (Enlargement) on Capture Window Not Shown

TILINGS OF MONO-CODE AND DUAL-CODE EMBEDDED DATA PATTERN STRIPS FOR ROBUST ASYNCHRONOUS CAPTURE

CROSS REFERENCES TO RELATED APPLICATIONS

This application is related to the following commonly assigned, concurrently filed U.S. patent applications: Petrie U.S. application Ser. No. 08/576,110 on "Tiled Embedded Block-Types for Generic Embedded Data Block Systems" (D/95402); Hecht et al. U.S. application Ser. No. 08/576,030 on "Tiled Embedded Data Blocks" (D/95402Q1); Hecht et al. U.S. application Ser. No. 08/576,031 on "Capture Windows for Capturing Asynchronously Tiled Embedded Data Blocks" (D/95402Q2); Hecht U.S. application Ser. No. 08/577,671 on "Autocorrelation Reconstruction of Asynchronously Captured Tiled Embedded Data Blocks" (D/95402Q3); Hecht U.S. application Ser. No. 08/577,672 on "Vector Reconstruction of Asynchronously Captured Tiled Embedded Data Blocks" (D/95402Q4).

FIELD OF THE INVENTION

This invention relates to embedded data codes and applications thereof.

BACKGROUND OF THE INVENTION

Copending, commonly assigned U.S. patent applications, such as Petrie et al. U.S. application Ser. No. 08/368,125 which was filed Jan. 3, 1995 on "Characterization of Embedded Data Blocks by Sync Frame Encodings of Distinctive Fixed Length Codes" (D/94914), Hecht U.S. application Ser. No. 08/368,112 which was filed Jan. 3, 1995 on "Extended Address Codes for Distributed Labeling and Unique Addressing of Embedded Data Patterns" (D/94916), and Hecht et al. U.S. application Ser. No. 08/649,749 which was filed May 15, 1996 as a continuation-in-part of U.S. application Ser. No. 08/368,124 filed Jan. 3, 1995 on "Distributed Dimensional Labeling of Embedded Data Blocks" (D/949181). describe a logically addressable explicit spatial synchronization mechanism and an embedded data block structure for self-clocking glyph codes. As used herein, a "self-clocking glyph code" is an embedded data pattern which encodes logically organized binary information in a pattern of individually detectable symbols or "glyphs" which, in turn, are written on a suitable recording medium in accordance with a predetermined spatial formatting rule. Such a code is "self-clocking" because all of the binary information is explicity encoded (typically, at a single bit level) in a recognizable property of the glyphs, such as rotational orientation, shape or color. Accordingly, the detection of the glyphs is sufficient to synchronize a properly oriented read/decode process with the recorded data pattern.

In practice, however, localized damage to self-clocking glyph code patterns or distortion of such data patterns may make it difficult to establish and maintain synchronization between a read/decode process and a given data pattern. In recognition of this, it has been proposed to add one or more subpatterns of synchronization glyphs to the data pattern to provide localized explicit synchronization references for the data pattern in a direction parallel to one or more axes of the data pattern. For example, these subpatterns of synchronization glyphs commonly are laid out in accordance with the same spatial formatting rules that govern the layout of remainder of the embedded data pattern to linearly extend across substantially the full span of the data pattern along the x and/or y axes. A predetermined logical sequence of binary values is encoded in the glyphs of each of these synchronization subpatterns, thereby enabling each of the subpatterns of synchronization glyphs to be recognized by confirming, such as by means of a correlation process, that the logically ordered decode values of the glyphs within these subpatterns are close logical matches to the known logical sequence of binary values that are encoded in the synchronization glyphs. As a general rule, the number of glyphs in a subpattern of synchronization glyphs is sufficiently large to ensure reliable recognition of such a subpattern in the presence of one or perhaps even more logical mismatches, such as might be caused by errors or ambiguities in the interpretation of the individual glyphs or by localized damage to the recorded data pattern.

Advantageously, the functionally distinct glyphs in a self-clocking glyph code (e.g., the synchronization glyphs and the glyphs for encoding variable data—the "data glyphs") are symbolically indistinguishable from each other. For example, such a glyph code commonly is implemented by employing slash-like visible symbols which are tilted from vertical at approximately +45° and −45° to encode binary "0's" and "1's," respectively. The use of such a symbol set for writing the glyphs facilitates the decoding of the code because the symbols that are utilized to encode the different binary values essentially are rotationally orthogonal to each other. However, a self-clocking code pattern that is composed of these slash-like symbols has a generally homogeneous visual appearance. Indeed, as the glyph density increases, the code pattern takes on a generally uniform gray scale appearance.

It sometimes is desirable to be able to uniquely identify interior locations within a self-clocking glyph code pattern. For this reason, it has been proposed to encode logically addressable binary sequences, such as a pseudo-noise sequence (sometimes referred to as a "PN sequence" or simply as a "PNS"), in the spatially ordered synchronization glyphs. As is known, a PN sequence is the ordered set of unique n-bit long subsequences a n-stage shift register generates when it is preloaded with a given seed value and operated with feedback taps at specified register locations. A "maximal length PN sequence" contains 2n−1 of these n-bit long subsequences.

An embedded data block structure for recording variable size self-clocking glyph code patterns in accordance with any one of a number of different geometric styles has been developed to incorporate the above-described features, together with some additional features. A simple rectangular embedded data block that is constructed in accordance with these structural rules is described hereinbelow, so for the moment it merely will be noted that this invention may be applied to such data blocks.

It is necessary or desirable for some applications to be able to capture embedded data from an embedded data pattern, such as glyph code pattern, by bringing a appropriately sized capture window to bear on a more or less randomly selected portion of the data pattern. This capture window may be constructed to capture the selected portion of the data pattern in a single parallel read operation or it may be constructed to capture the selected portion of the data pattern by scanning operation.

SUMMARY OF THE INVENTION

In accordance with this invention, to facilitate the recovering data from an embedded data pattern through the use of a appropriately sized capture window that is randomly positioned within the data pattern, the embedded data pattern is composed of a plurality of identical, one dimensionally or two dimensionally regularly tiled embedded data blocks which contain sufficient spatial addressing information to permit the logical reconstruction of a complete data block from any set of fragments that collectively provide a full cover for the surface area of any one tile. To this end, the capture window is sized to include a shape which is completely registered with the data pattern and which is capable of tiling the recording medium in accordance with the tiling vectors.

BRIEF DESCRIPTION OF THE DRAWINGS

Further objects and advantages of the present invention will be evident when the following detailed description is read in conjunction with the attached drawings, in which:

FIGS. 8 and 9 illustrate a spatially asynchronous readout of a data pattern of the type shown in FIG. 7;

FIG. 13 illustrates an application of this invention to image vignetting and/or embedded data patterns that are partially overwritten or otherwise destroyed;

FIG. 15 illustrates a non-rectangular data block and related capture window features;

FIGS. 16 and 17 illustrate a unidimensional shear tiling and related capture window design factors;

FIG. 18 illustrates a capture window for an alternative data block reconstruction process;

FIG. 21 illustrates logical reconstruction of data blocks by vector expansion of the capture window view;

FIG. 24 illustrates linear and square, interlaced dual shear tilings of a single subperiodic code pattern.

DETAILED DESCRIPTION OF THE ILLUSTRATED EMBODIMENTS

While the invention is described in some detail hereinbelow with reference to illustrated embodiments, it is to be understood that there is no intent to limit it to these exemplary embodiments. On the contrary, the intent is to cover all modifications, alternatives and equivalents falling within the spirit and scope of the invention as defined by the appended claims.

Figure 1:
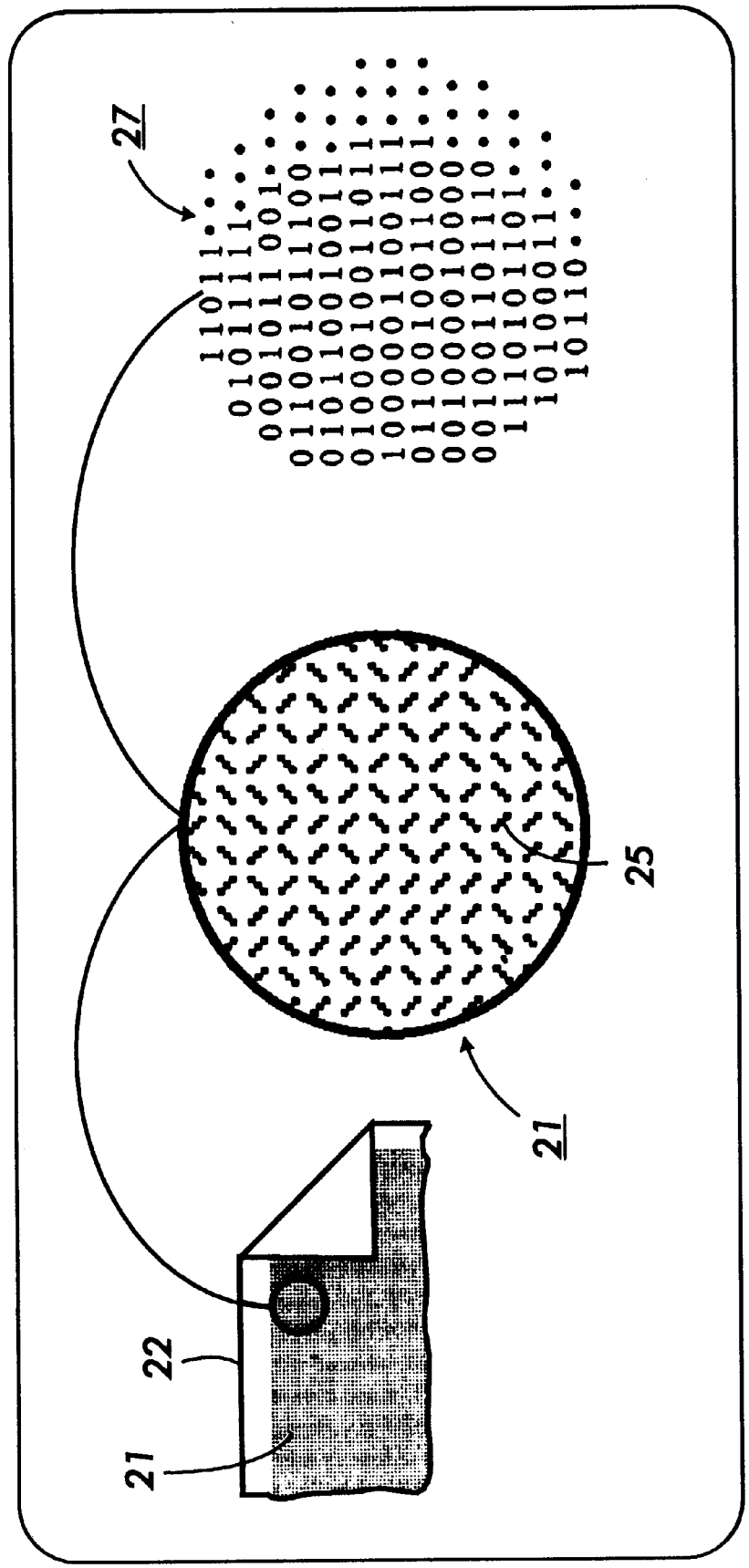
FIG. 1 illustrates a self-clocking glyph code pattern, together with a magnified fragment of the glyph code and an example of the machine readable binary values that might be encoded by the glyphs within this fragment of the code.

Turning now to the drawings, and at this point especially to FIG. 1, there is a self-clocking glyph code pattern 21 which may be constructed in accordance with the present invention to permit reliable recovery of the binary data that is embedded in the glyph code pattern. Each of these data values is represented by the presence of a glyph 25 and is encoded in a detectable property of that particular glyph. Thus, no data is encoded in the spaces between the glyphs 25 or in the transitions that define their edges. For example, the glyphs 25 typically are slash-like symbols which are titled to the right and left at approximately at +45° and −45° with respect to the longitudinal axis of the recording medium 22 on which they are written to encode binary "0's" and "1's," respectively, as indicated at 27. Accordingly, the glyphs 25 usually are written on substantially uniformly spaced centers to give the glyph code pattern 21 a generally homogeneous visual appearance. Indeed, the scale on which the glyph code pattern 21 is printed often is sufficiently small to cause the individual glyphs 25 to blend together when viewed by the unaided eye, thereby causing the glyph code pattern 21 to have a more or less uniform gray scale appearance. Therefore, while it will be apparent that the present invention may be applied to other types of embedded data patterns, it is to be understood that self-clocking glyph codes are preferred, especially for applications in which the visual esthetic of the embedded data pattern is important.

In view of the above noted preference, it should be noted that a self-clocking glyph code does not necessarily include any fiduciary mark clues for aiding a user to properly register a capture window with any internal segment of the code pattern. Even more particularly, for some applications it is preferable to avoid having visible fiduciary markings or other registration aids in or about such a code pattern because such registration aids detract from the visual homogeneity of the code pattern.

As described in more detail in some of the above-identified copending patent applications, embedded data blocks for self clocking glyph codes and the like suitably are constructed by writing the data encodings (i.e., the data glyphs) onto an orthogonal lattice of more or less uniformly spaced centers in accordance with a spatial formatting rule which composes each data block to have one or more rectangular, fixed size (S+1)×(T+1) fully filled "frames," together with in some situations one or more partially filled or fractional frames. Neighboring frames within such a data block are contiguous with each other and are "linked" because they share the "frame" glyphs that are written along their common border. Each data block includes at least one fully filled frame, but additional fully or partially filled frames may be added to increase the data block size up to an upper limit that is determined by the maximal lengths of the PN sequences that are used for spatially synchronizing the read process with the data block along the x-axis and the y-axis and for providing the read process with information concerning the geometric type or class and the size of the data block.

Figure 2:
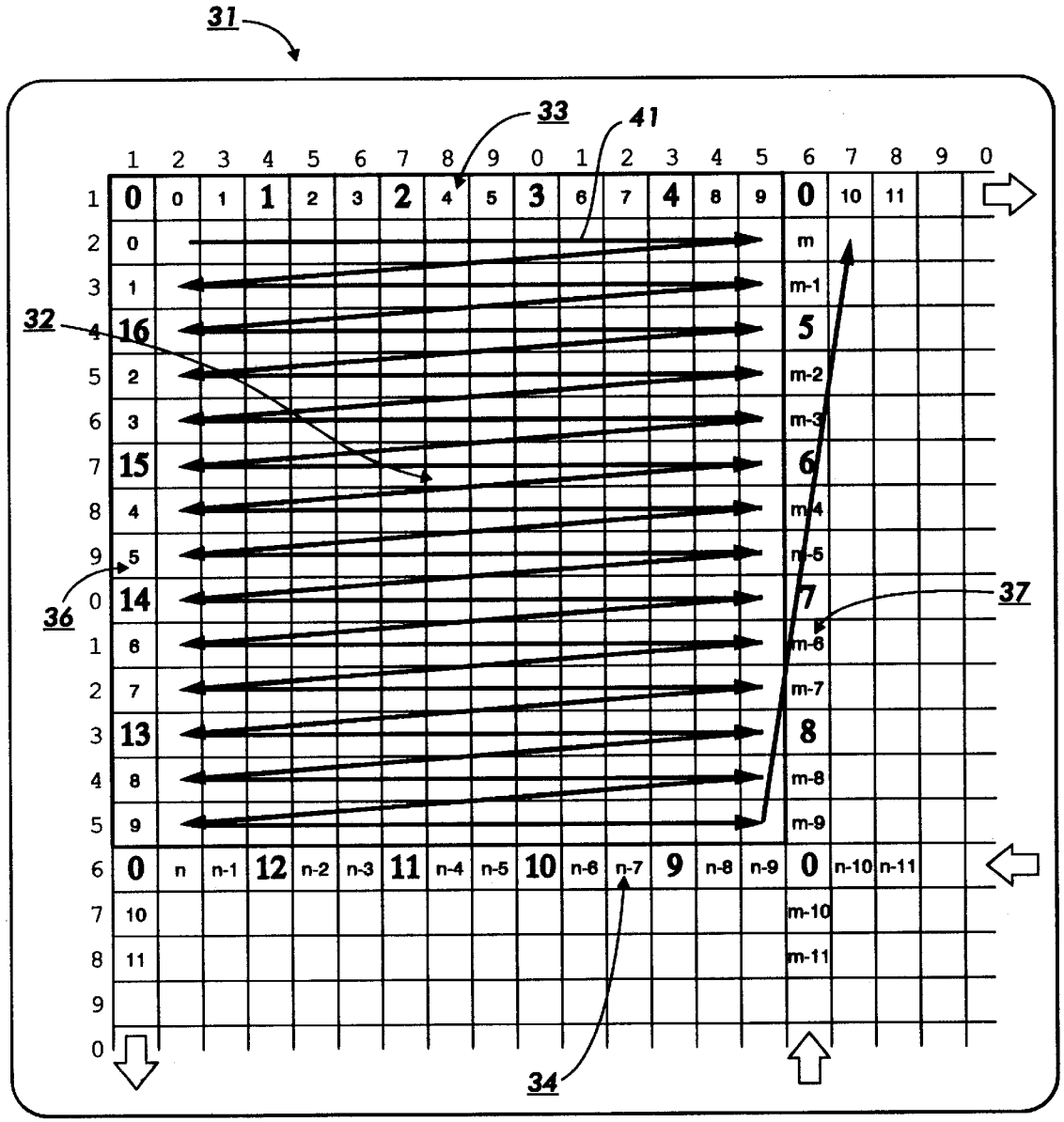
FIG. 2 schematically illustrates a frame of a simple rectangular embedded data block structure.

More particularly, as shown in FIG. 2 in accordance with the rules that govern the construction of such data blocks, the row and column of centers that intersect at a reference location within the data block 31 (in most cases, the upper left-hand corner), as well as every $S^{th}$ row and $T^{th}$ column of centers with the data block 31, are reserved for use as x-sync lines and y-sync lines, respectively. Thus each fully filled frame 32 within the data block 31 is bounded by a pair of x-sync lines 33, 34 and a pair of y-sync lines 36, 37.

The glyphs that are written at the intersections of the x-sync lines 33 or 34 and the y-sync lines 36 or 37 (i.e., the glyphs at the corners of the frame 32) may be reserved for encoding flag bits which indicate whether the frame 32 includes a special processing code word or not. There is a cyclically repeating pattern to the functions of the glyphs that are written on these x-sync lines 33 and 34 and y-sync lines 36 and 37 because the first two glyphs (i.e., the "sync glyphs") in each cycle of this repeating pattern encode successive bits of a PN sequence, while the third and final glyph (the key codeword "glyph") of each cycle encodes a respective bit of a key codeword or of an error correction codeword for the key codeword.

The PN sequences that are encoded by the sync glyphs that are written on alternate x-sync lines 33 and 34 are of the same or different maximal length, but counter propagate from the opposed lateral extremities of the embedded data block 31. Similarly, the PN sequences that are encoded by the sync glyphs that are written on alternate y-sync lines 36 and 37 are of the same or different maximal length and counterpropagate from the opposed longitudinal extremities. These PN sequences are encoded by the glyphs written on the x-sync lines 33 and 34, as well as by the glyphs written on the y-sync lines 36 and 37 at a ⅔ data cycle. Thus, the size of the data block 31, as measured in glyphs, can be determined by the sum of the PN sequence index numbers of the bits that are encoded by spatially aligned sync glyphs on the x-sync lines 33 and 34, respectively, as well as the sum of the PN sequence index numbers of the bits that are encoded by spatially aligned sync glyphs on the y-sync lines 36 and 37, respectively.

The sync glyphs written on every other x-sync line, such as the odd numbered x-sync lines 33, encode a PN sequence that is used by all block types for spatially synchronizing the read process with the data block 31 in the x-direction. On the other hand, the PN sequence that is encoded in the sync glyphs that are written on the alternate or even numbered x-sync lines 34 encode a PN sequence which uniquely identifies the block type. Similarly, the sync glyphs that are written on the odd numbered y-sync lines, such as the sync line 36, encode a block-type independent PN sequence for spatially synchronizing the read process with the data block in the y-direction, while the sync glyphs that are written on the alternate or even numbered y-sync lines 37 encode a block-type dependent PN sequence for uniquely identifying the block-type. As will be appreciated, absolute x/y addressing of interior locations within the data block is provided because each of the bits within the PN sequences that are used for x/y synchronization has a unique index number that is determined by its position within the logical ordering of the PN sequence to which it belongs.

Figure 3:
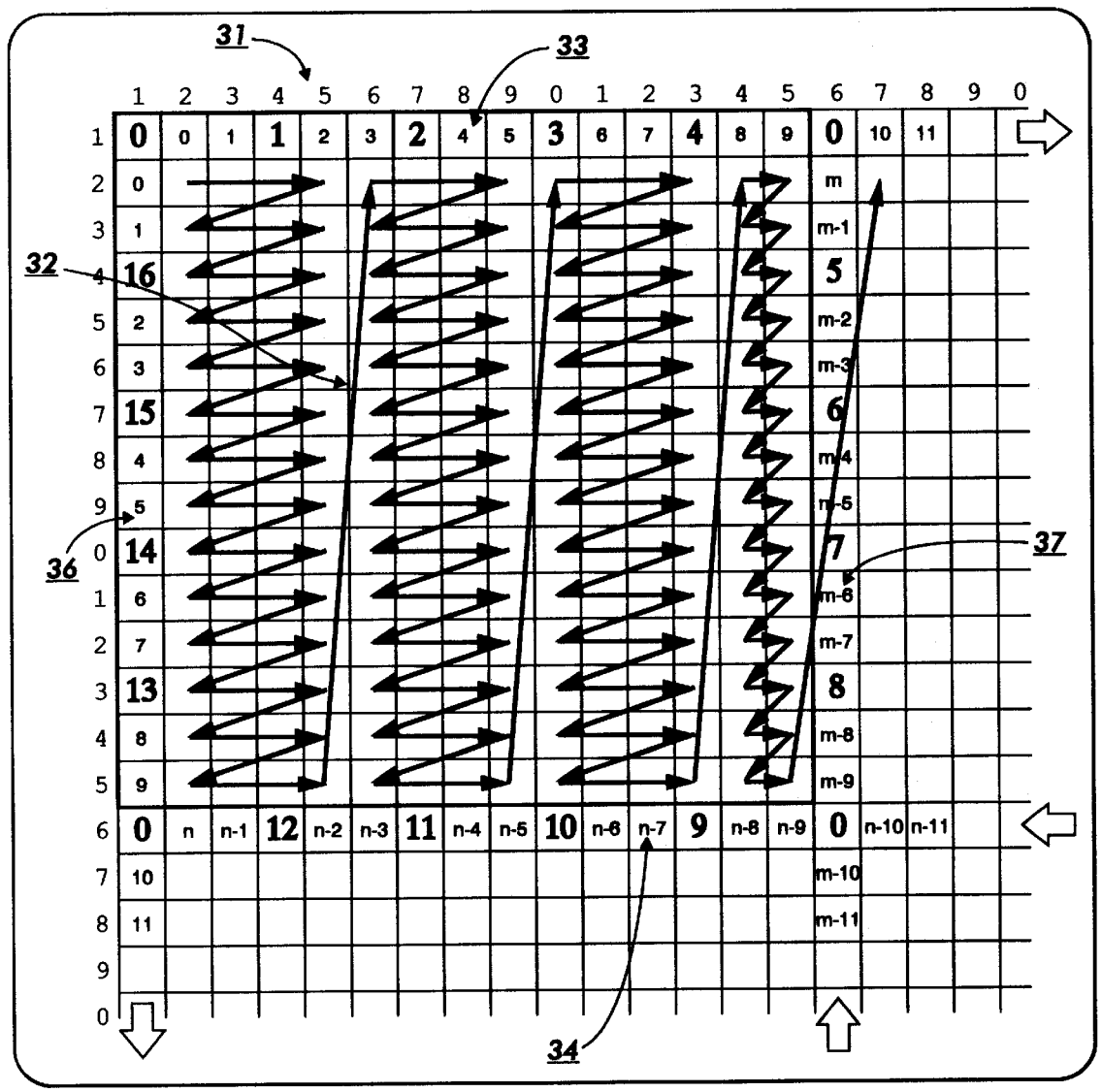
FIG. 3 schematically illustrates an alternative fill order for the frame shown in FIG. 2.
Figure 4:
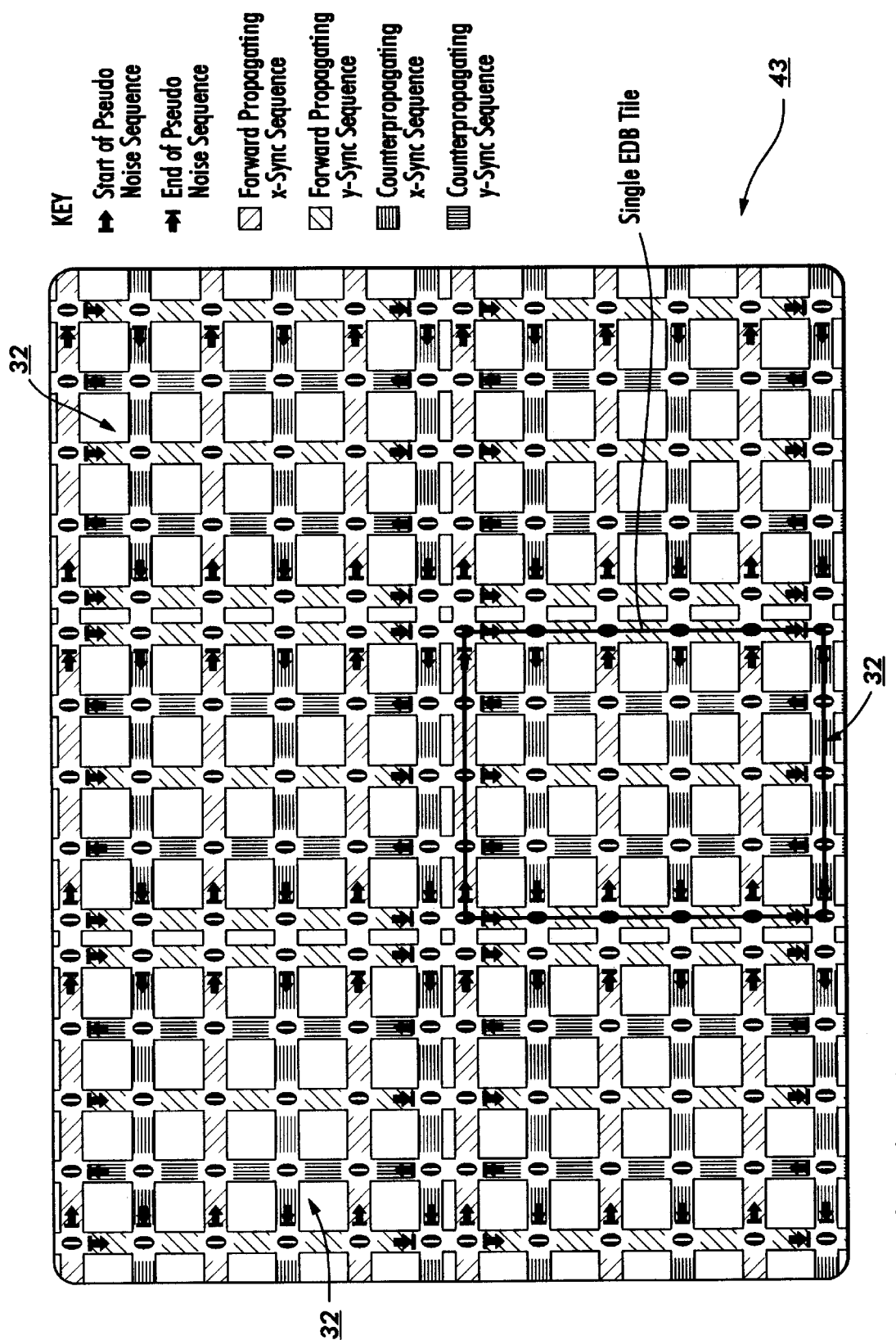
FIG. 4 schematically illustrates a regular two dimensional tiling of identical embedded data blocks that are composed of one or more frames, possibly including partial frames, of the type shown in FIGS. 2 or 3.
Figure 5:
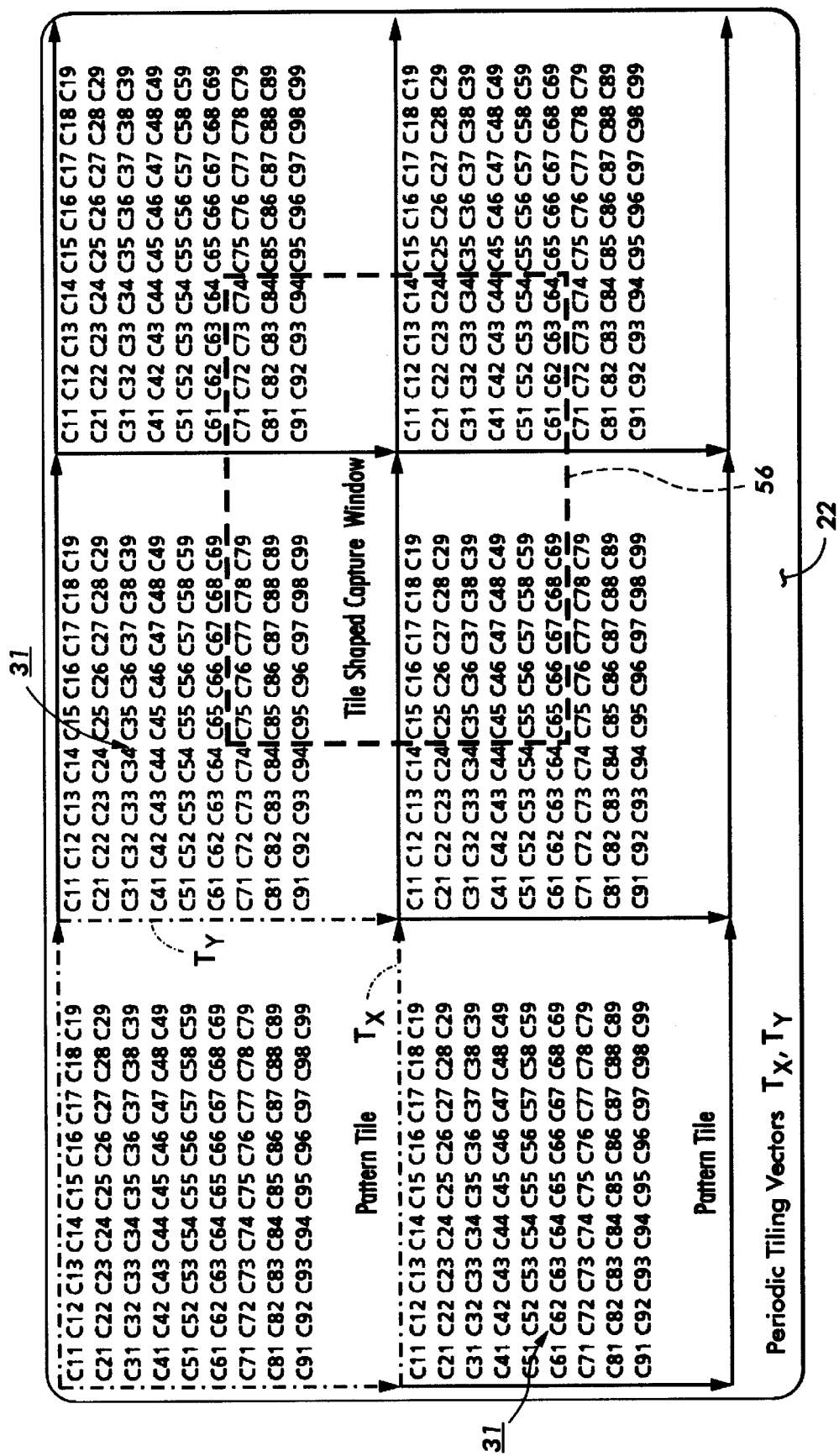
FIG. 5 schematically illustrates a regular two dimensional tiling of identical, but spatially non-contiguous, embedded data blocks, in a functional matrix referenced notation, together with a capture window that is sized to conform to the tiling.

Referring to FIG. 2, logically ordered user data may be mapped into the data glyphs to fill each frame 32 in left-to-right, top-to-bottom order as indicated by the arrows 41. This provides a strong linear component to the layout of data bytes in the embedded data pattern which may not be optimal in some cases. Thus, as shown in FIG. 3, a columnarly oriented frame fill order can be employed if desired to provide a more strongly folded mapping of data bytes into the data glyphs within the embedded data frames 32. In either case, as shown in FIG. 4–5, replicas of the embedded data block 31 can be tiled onto the recording medium 22 to provide a regular one dimensionally or two dimensionally tiled embedded data pattern 43.

Figure 6:
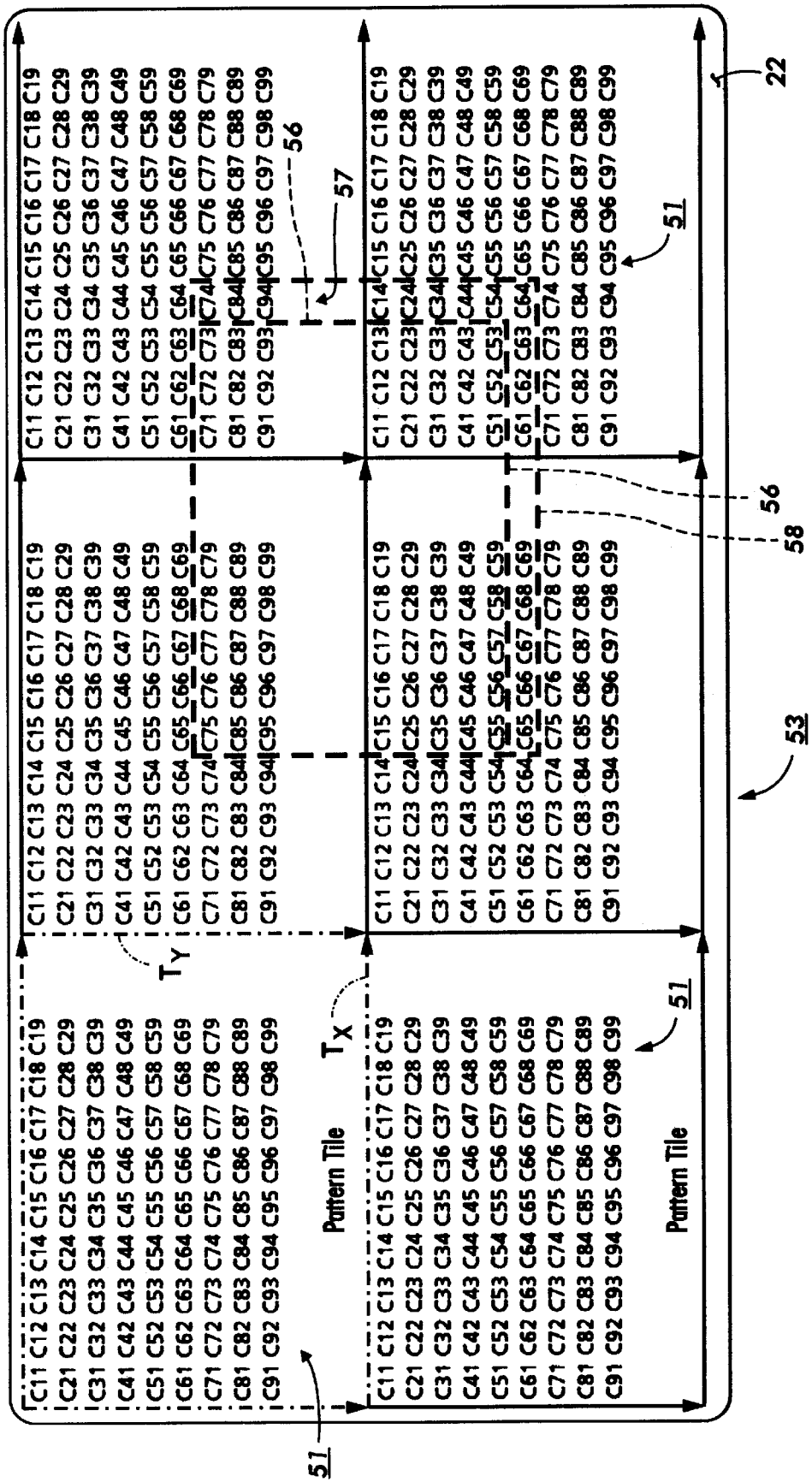
FIG. 6 schematically builds on FIG. 5 by showing a somewhat larger capture widow to provide a safety margin.
Figure 7:
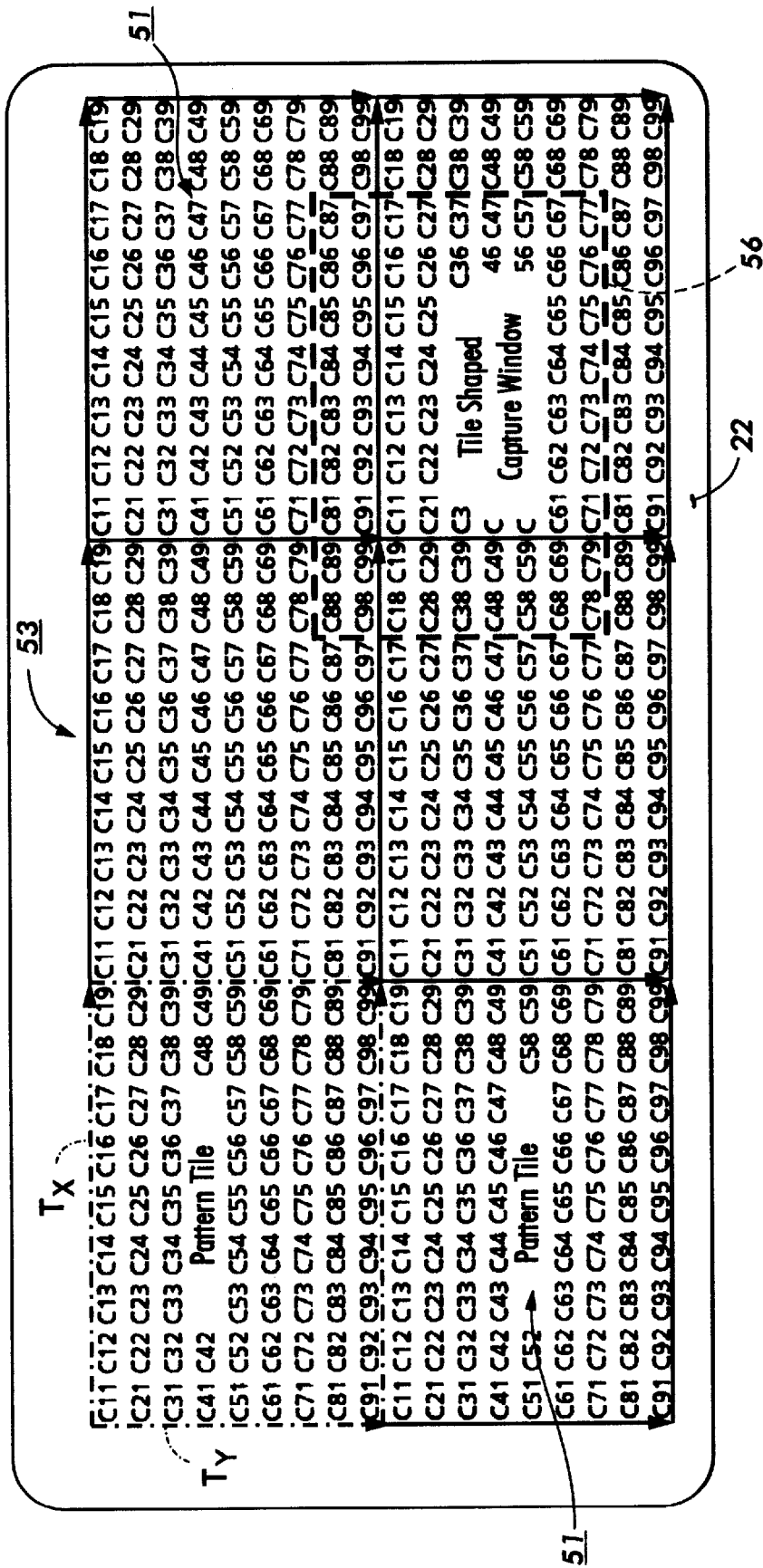
FIG. 7 illustrates an alternative to FIG. 5 by showing that the two dimensionally tiled data blocks can be spatially contiguous.

Turning to FIG. 6, the present invention enables an embedded data block 51 to be reconstructed from information that is provided by the embedded data character (e.g., "glyphs") that are captured by a appropriately sized capture window 56 that is randomly registered within a regular one dimensionally or two dimensionally tiled embedded data pattern 53. This tiled embedded data pattern 53 is composed of multiple copies of the embedded data block 51 which are distributed on the recording medium 22 in accordance with one or an orthogonal pair of predetermined tiling vectors, such as at $T_x$ and $T_y$, which may be selected to produce a regular non-contiguous or a contiguous tiling of the embedded data pattern, as shown in FIGS. 6 and 7, respectively.

Each tile contains a replica of the embedded data block 51, so it is theoretically possible to capture the embedded data block 51 by using a capture window 56 that dimensionally conforms to the size of the individual tiles. See FIGS. 5 and 7. In practice, however, a capture window that is randomly registered within the tiled embedded data pattern 53 may truncate the embedded data characters or glyphs at the upper or lower edges and/or at the right-hand or left-hand edges of the capture window 56, unless a safety margin of at least one character or glyph center-to-center span is added to the horizontal and vertical dimension window, as indicated at 57 in FIG. 6. However, even with this expanded capture window 58, it may be necessary to reconstruct the embedded data pattern 51 from fragments of two or more of the tiles in view of the random registration of the capture window 58 with the tiled embedded data pattern 53.

Figure 8:
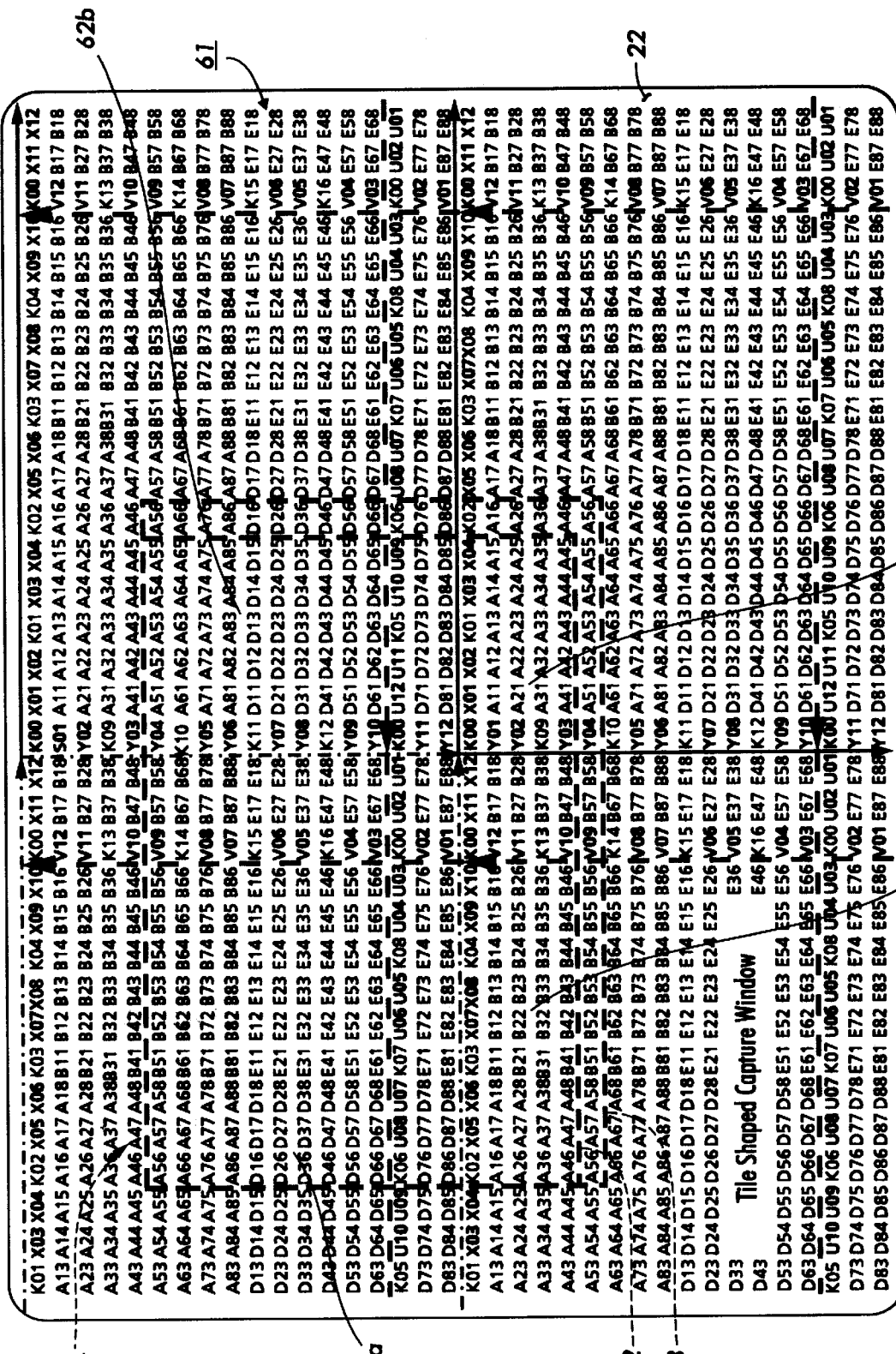

Referring now to FIG. 8, there is an embedded data pattern 61 that is composed of two dimensionally tiled replicas of an embedded data block 62 which is constructed in accordance with the above-described embedded data block structure (see FIGS. 2–5). The alphabetic of the notational references that are included in FIGS. 8 and 9 functionally classify the glyphs within the embedded data block 62 as follows: the "A," "B," "D" and "E" designators represent glyphs which encode variable data and the related error correction code(ECC) for such data, the "K00" designators represent glyphs that encode special processing codeword flags, the other "K" designators represent glyphs that encode the key codeword and the ECC for the key codeword, the "X" designators represent the glyphs that encode a forwardly propagating block-typing independent PN sequence on alternative x-sync lines, the "U" designators represent the glyphs that encode a counterpropagating clock-type dependent PN sequence on the other x-sync lines, the "Y" designators represent the glyphs that encode a forwardly propagating block-type independent PN sequence on alternate y-sync lines, and the "V" designators represent the glyphs that encode a counterpropagating block-type dependent PN sequence on the other y-sync lines the numeric references, on the other hand, specify the spatial locations of the glyphs within the respective tiled replicas of the data block 62.

In accordance with the present invention, the embedded data block 62 can be reconstructed from the information that is captured by a randomly registered capture window 63 which has an aperture that fully spans a field that covers some tile that would tile an image plane in accordance with the same periodic tiling vectors $T_x$ and $T_y$ that are used produce the tiled embedded data pattern 61. As previously pointed out, the capture window 63 may include a safety margin (indeed, a safety margin as large as roughly three times the center-to-center spacing of the glyphs has been used for some implementations), so there may be some overlap to the image plane tiling that is afforded by an appropriately sized capture window 63. Similarly, for applications in which the magnitudes of the tiling vectors $T_x$ and/or $T_y$ are variable, such as in an application that involves embedded data patterns that are composed of contiguous tiled replications of variable size embedded data blocks, the capture window 63 may be sized to accommodate the largest permissible tiling vectors $T_x$ and $T_y$, together with an adequate safety margin.

Turning to FIG. 9, it will be seen that an appropriately sized capture window 63 effectively captures the contents of the embedded data block 62 (to simplify the discussion, read errors and the error correction that typically is provided to avoid perpetuating such errors will be ignored) from one or more of the tiles of the embedded data pattern 61. The information that is captured may, as shown in FIG. 9, may be spatially disordered because the random registration of the capture window 63 with respect to the data pattern 61 may result in the information being acquired from fragments of two or more of the tiles, such as at 62a–62d in FIG. 8. Moreover, the information that is captured may be partially redundant if the capture window 63 is oversized, such as to provide a safety margin as shown or to accommodate tilings of variable size data blocks.

In keeping with one embodiment of the invention, any necessary reconstruction of the data block 62, as well as any necessary suppression of redundant information, are performed by using the counterpropagating maximal length PN sequences that are encoded by the sync glyphs on the x-sync lines 33, 34 and by the sync glyphs on the y-sync lines 36, 37, respectively, together with the self-clocking property of the embedded data pattern 61, to logically reconstruct the data block 62 from the "capture window view" of the recorded data pattern 61 (e.g., the data block fragments 62a–62d). As will be seen the counterpropagating x-oriented and y-oriented address codes are employed for determining the x/y dimensions of the data block 62 and for referencing the capture window view of the embedded data pattern 61 to a logical x/y address space. The self-clocking property of the data pattern 61, in turn, is utilized for mapping the capture window view of the data pattern 61 into this logical address space on the basis of the absolute address reference that the data pattern 61 is found to contain.

In view of the role the self-clocking property of the embedded data pattern 61 plays on maping the capture window view of the data pattern into logical x/y address space, it will be understood that this particular embodiment operates on the assumption that the data pattern 61, if tiled, is composed of a one or two dimensional rectangular tiling of the data block 62 on periodic tiling vectors $T_x$ and/or $T_y$ that are selected so that the replicas of the data block 62 in neighboring tiles are spatially contiguous. In that event, the self-clocking property of the embedded data pattern 61 logically links the tiled replicas of the data block 62 to each other such that the capture window view of the data pattern 61 can be mapped into logical x/y address space once the address space has been referenced to the capture window view of the data pattern 61. This embodiment does not, however, presuppose that the embedded data pattern 61 is tiled, so it has additional generality for applications involving both tiled and non-tiled embedded data patterns.

Figure 10:
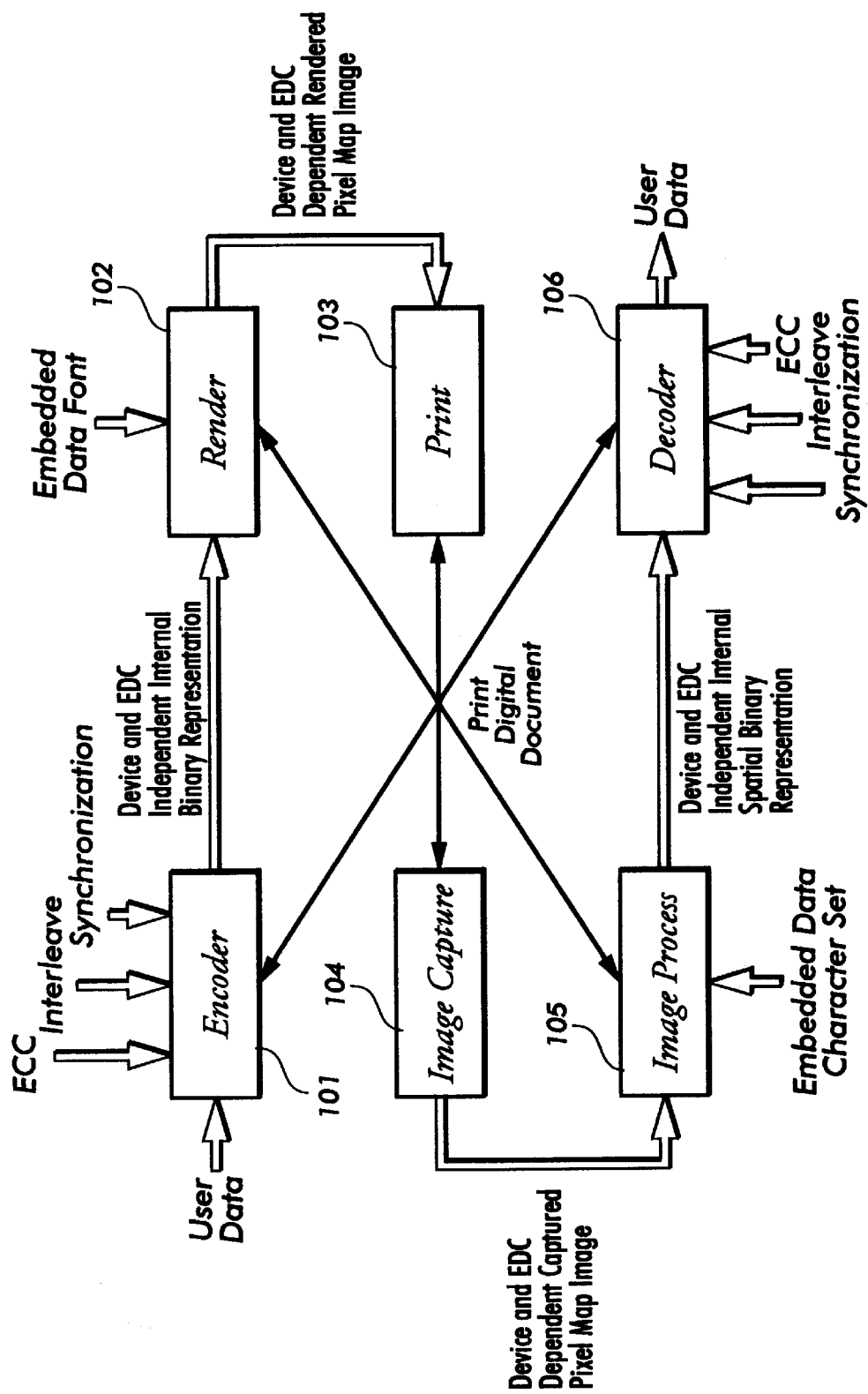
FIG. 10 schematically illustrates the architecture of an embedded data system.

To facilitate the referencing of the capture window view of the embedded data pattern 61 to logical x/y address space, the binary information that is encoded by the glyphs within that view is first transformed, as at 71 in FIG. 10, from the image domain to the logical domain. This transformation maps the embedded information into a binary equivalent matrix/logic matrix in accordance with the capture window view.

As will be appreciated, the capture window 63 may be expanded if it is desired to increase the safety margin. For instance, consideration has been given to providing a safety margin of approximately three times the usual center-to-center glyph spacing.

Preferably, tiled embedded data blocks are just one of the block structures that are supported by an embedded data system. For example, as shown in FIG. 10, such a system suitably includes an encoder 101, a rendering mechanism 102, a print engine 103, an image capture mechanism 104, an image processor 105, and a decoder 106.

Typically, byte ordered user data is loaded into the encoder 101. The encoder 101, in turn, computes a byte or bit oriented error correction code (ECC) on the user data, and then redistributes the data bits and the ECC bits in accordance with a predetermined interleaving algorithm to provide increased protection against catastrophic failure due to burst errors caused by localized damage to the recorded data pattern. Synchronization, block identification, key code word and other framing codes are then added to the interleaved data and ECC to provide an internal binary representation of a formatted embedded data clock of a selected type (e.g., simple rectangular, border or tiled). This internal representation is device and EDC independent. Data blocks which are intended to be tiled onto the recording medium 22 repeatedly rendered by the rendering mechanism 102, thereby causing them to cause the print engine 103 to tile them onto the recording medium in accordance with the appropriate tiling vector or vectors.

The rendering mechanism 102 typically employs a pre-selected embedded data font for converting the binary representation of the formatted data block into a corresponding device and embedded data character (EDC) dependent pixel map image for printing by the print engine 103.

A pixel mapped representation of the embedded data block is captured from the recording medium by the image capture mechanism 104. This device and EDC dependent representation then is operated on by the image processor 105. The image processor 105 interprets the pixel mapped representation of the embedded data block in accordance with the logical interpretation assigned to the EDC fonts to convert the pixel mapped image into a device and EDC independent internal binary representation that is logically organized to preserve the spatial relationship of the EDC's in the pixel mapped image. As will be seen, this enables the decode processor 106 to logically re-organize its internal binary representation of the captured embedded data block representation if it is found during the processing of the captured block representation that logical reconstruction of the data block is required.

After synchronizing itself to the x and y-sync codes and extracting the processing information that is carried by the sync codes and the other framing codes, the decoder 106 strips the framing codes (e.g., the sync codes, etc.) from the binary representation of the embedded data block. The decoder 106 then de-interleaves the binary representation of the user data and the ECC. This enables the decoder 106 to apply the ECC to the user data, so the user data is output thereby in error corrected form.

One of the principal advantages of using a generic embedded data block structure for a family of different embedded data block types is that many of the same processes can be employed for writing and reading the different data block types. Tiled embedded data blocks that are captured by a spatially asynchronous readout of a tile embedded data pattern often require some additional image processing to logically reconstruct then, but this does not interfere with the image processing for other types of data blocks.

Figure 11:
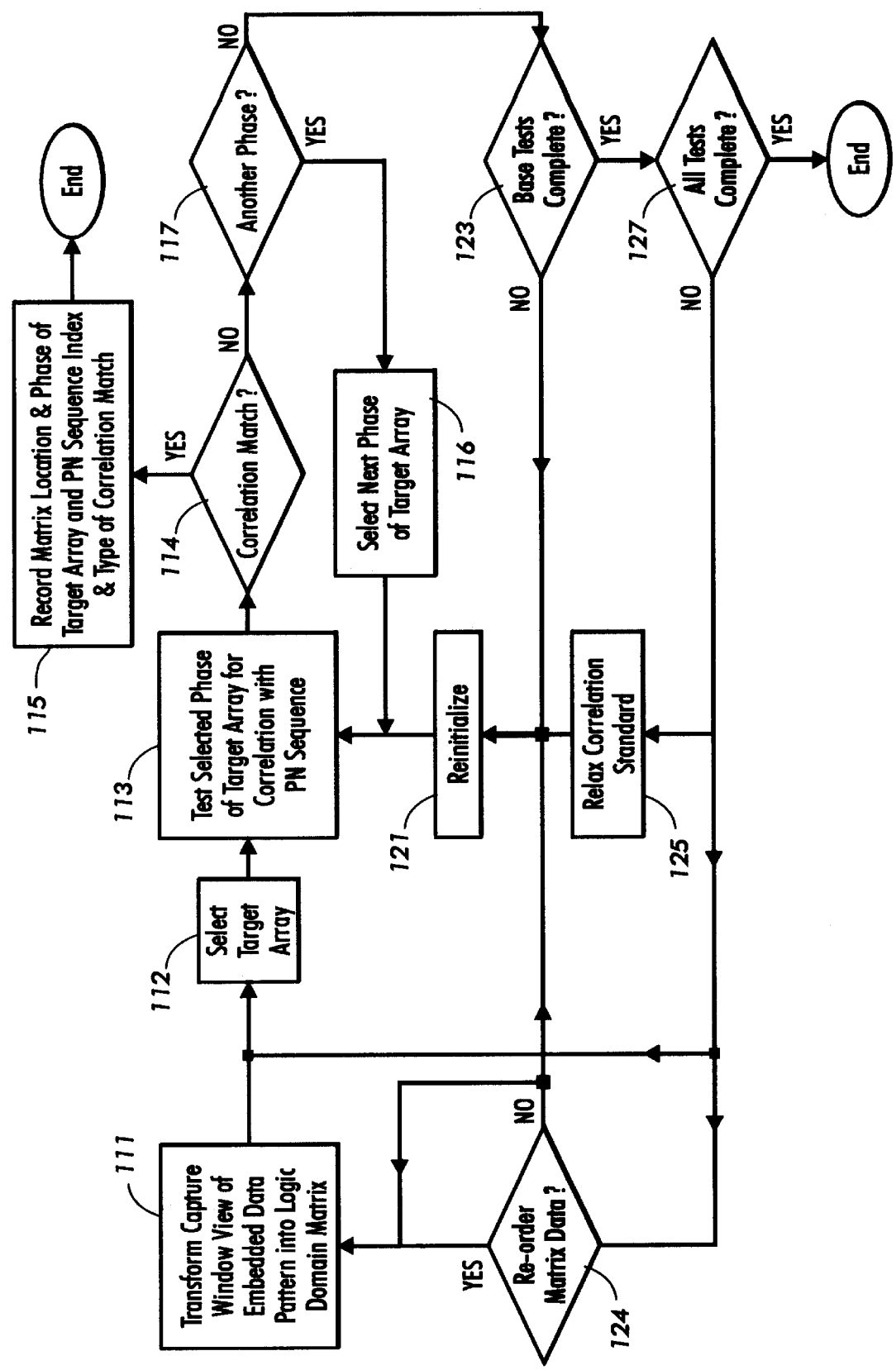
FIG. 11 diagrammatically illustrates a process for referencing embedded data blocking to a logical address space.

Condidering the processing that is performed by the decoder 106 in some additional detail while referring to FIG. 11, it will be seen that the decoder 106 carries out series of correlation tests against selected rows and columns (i.e., arrays) of the matrix organized data that is supplied by the image processor 105 (FIG. 10) to identify the x and y-sync and sync id lines of the EDB and to locate the bits on those lines in logical absolute address space. There is a one-to-one mapping of the glyphs (i.e., the EDC's) of the image domain representation of the EDB into this matrix organized data so the EDB is spatially referenced to absolute address space once the absolute addresses of the bits on the sync lines is known. Further, the block-type is uniquely identified by the PN sequences that are encoded on the x-sync id and y-sync id lines of the EDB, so the block type can be ascertained by finding the PN sequence that correlates with block-type id encodings. Moreover, the PN sequences that are encoded on the x-sync and sync id lines of the EDB, as well as the PN sequences that are encoded on the y-sync and y-sync id lines of the EDB, are counterpropagating. The x and y dimensions of the EDB are given in a glyph count matrix by the sum of the indices of those counterpropagating sequences at any given column or row, respectively, of the data matrix 111.

The correlation testing starts with the selection of a target array as at 112. A sliding correlation test then is performed at 113 to determine whether any of the PN sequences that run in the direction of the array (i.e., along the x-axis or the y-axis of the EDB) correlates with one or another of the permissible phases of the target array 112. In the illustrated embodiment, there are three permissible phases of the target array (i.e., Phase 0, Phase 1 and Phase 2) because of the encoding of the PN sequences in the glyphs on the sync lines at a ⅔ duty ratio.

If a correlation match is found to exist at 114, the matrix location and correlating phase of the target array are recorded at 115, together with the PN sequence-type and the PN sequence index of the correlation. On the other hand, if the examination of one phase of the target array is completed without finding any correlation, the process recycles, as at 116, to examine the next phase of the array, until it is determined at 117 that all of the permissible phases have been tested.

As will be recalled, the PN sequences for the illustrated embodiment are n-bit maximal length shift register sequences. Thus, a correlation match suitably is declared to exist at 114 whenever one of the PN sequences correlates with the target array over any n-bit plus consecutive confidence bits. This provides extra bits for ratifying the correlation, thereby confirming the existence of the correlation to a confidence level. Of course, the correlation match length could be increased to provide increased confidence or decreased if less confidence is tolerable.

Following the examination of one target array, another target is selected as at 112 and the correlation process is re-initialized as at 121 for the examination of this next array. These additional correlation tests are guided by the information that is accumulated at 115 with respect to prior successful correlations, so the selection of the target arrays, the ordering of the correlation testing of the PN sequences, and the sequence index at which to commence the correlation testing becomes increasingly precise over time.

The standard correlation testing of smaller embedded data blocks may not yield correlation matches along the rows and/or columns of the data matrix 111. Consequently, if it is determined at 123 that a correlation failure has occurred while examining the rows or columns of the data matrix 111, the process may further recycle to re-initialize the correlation testing to examine one or more re-ordered versions of the matrix organized data, as at 124, and/or to re-conduct the correlation processing while using a relaxed correlation standard, as at 125. For example, in the case of small tiled embedded data blocks, a reverse order shift of one or more rows of data from the bottom to the top of the matrix 111 often is sufficient to yield successful correlation matches while using the normal correlation standard. It also is possible to relax the correlation standard, as at 125, but this is done at the cost of reducing the confidence level in the correlations that are found. A correlation fault is declared at 127 only if no correlations can be found along one or the other of the axes of data matrix 111.

Figure 12:
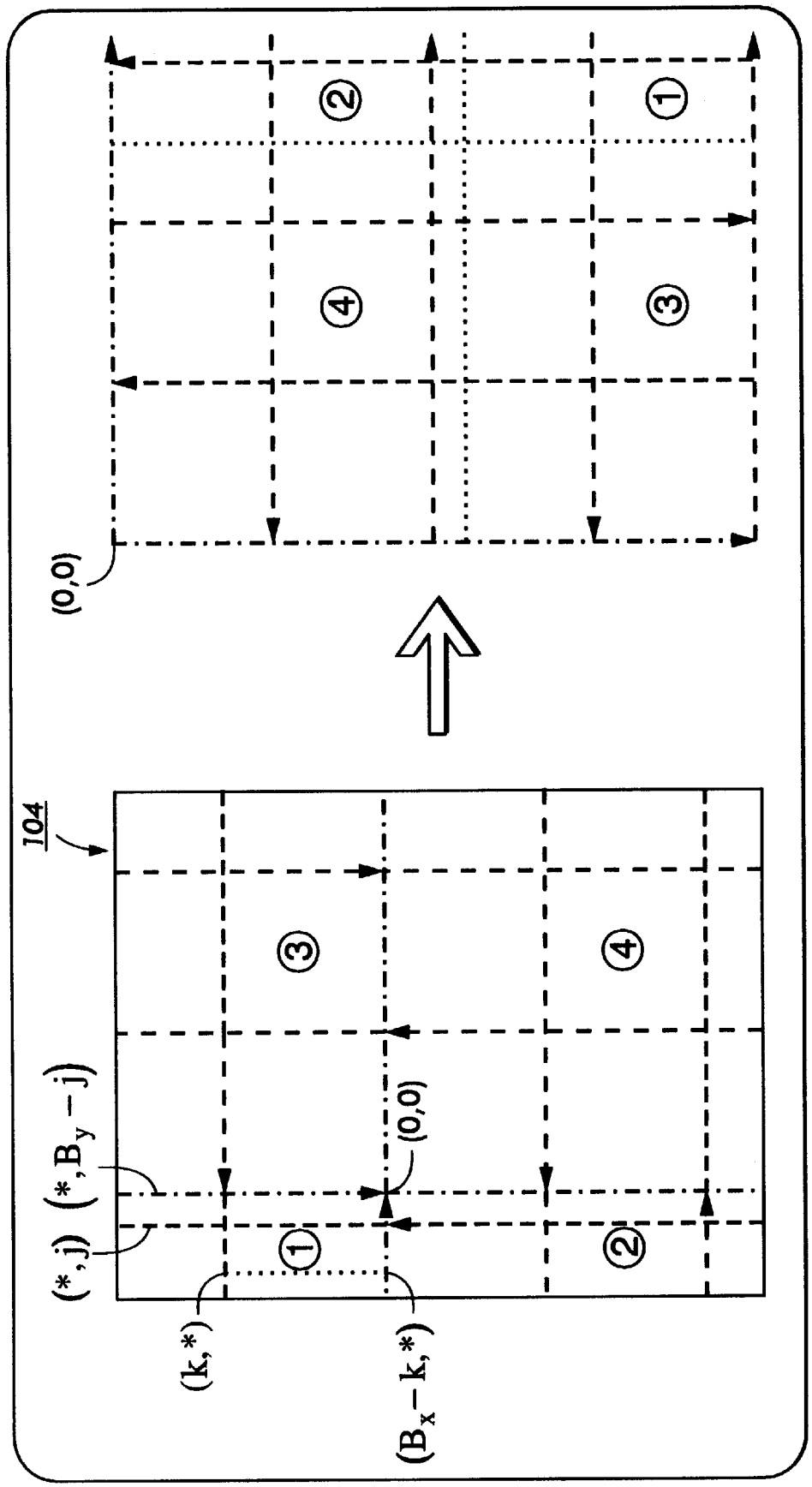
FIG. 12 illustrates a logical reconstruction of an embedded data block.

FIG. 12 illustrates an application of the above-described correlation process to the logical reconstruction of tiled embedded data blocks. One of the principal advantages of including a recognizably tiled embedded data block type in a more or less general purpose embedded data block system (i.e., a system that supports other block-types, such as the simple rectangular block-type and/or the border block-type that are described in the above-referenced copending Petrie applications) is that it sometimes is necessary or desirable to spatially asynchronously capture embedded data from an embedded data pattern. Defining a recognizably block-type for those situations provides the necessary system support, without detracting from the generality of the embedded data block system or unduly increasing its complexity. If desired, however, special purpose data block tiling systems could be provided for applications involving a spatially asynchronous capture of the embedded data.

Preferably the tiling vector or vectors that are used to tile an embedded data block onto a recording medium are selected so that the tiled instances of the embedded data block are spatially contiguous to each other and are laid-out on a common, spatially periodic lattice of center to at least a first approximation. This causes tilings of data blocks that are written using a self-clocking glyph code to have a generally uniform visual appearance. Furthermore, it facilitates using the glyphs of such glyph codes as navigational aides for shifting from point-to-point within any one or more of the tiled data blocks. A spatially asynchronous read out could be employed for capturing data from tiled, non-contiguous copies of an embedded data block if the data block copies are written on a spatially periodic lattice of centers and/or if provision is made for performing the additional image processing that would be needed to logically link the copies to each other. However, the following discussion focuses on the logical reconstruction of an embedded data block from a spatially asynchronous, appropriately configured, capture window view 104 of an embedded data pattern that is composed of a tiling of spatially contiguous copies of the data block. A more detailed discussion of the capture window view that is needed to perform this logical reconstruction follows. Thus, for now, it simply will be assumed that the capture window view spans a shape that is capable of tiling the recording medium in accordance with the tiling vectors of the embedded data pattern that is interest.

As shown in FIG. 12, the capture window view 104 of the embedded data pattern is transformed into a corresponding matrix organized binary data structure, using a one-to-one mapping to preserve the spatial ordering of the data. As previously described, this matrix data then is examined for correlation matches with the PN sequences that are encoded by the sync glyphs that are written on the x and y sync and sync-id lines of the data block. The first correlation simply identifies one coordinate of a point, such as (*, j) in logical address space. However, in view of the fixed frame size (e.g., 15 glyphs×15 glyphs) of the illustrated block structure and the self-clocking property of the glyph code, this one coordinate provides useful "hints" for locating nearby parallel and orthogonal sync and sync id lines. Moreover, these "hints" become increasingly reliable as the correlation process continues toward completion because the additional correlations not only provide the information that is needed for determining the block size (i.e., the sums of the counterpropagating PN sequence indices for any two columnwise corresponding points on the y-sync and y-sync id lines define the x and y dimensions, respectively, of the data block in a glyph count metric), but also progressively map the matrix organized data into a logical absolute address space. As will be appreciated, the PN sequence indices define the addresses in this address space. Thus, some of the glyphs, such as the glyph at the upper left-hand corner (0,0) of the embedded data block are directly referenced to this address space, while the other glyphs are strongly referenced to it by their self-clocking property and by their proximity to glyphs that reside at precisely defined addresses in the address space.

Once the dimensions of the data block are known and the glyphs are spatially referenced to logical address space, the logical reconstruction of the data block involves a logical re-interpretation of the ordering of the matrix organized data so that all subsequent processing of the matrix data is carried out in logical address order. This may be enforced by resorting the matrix organized data in address order or by setting address pointers and wrap-around links on the matrix data.

Figure 13:
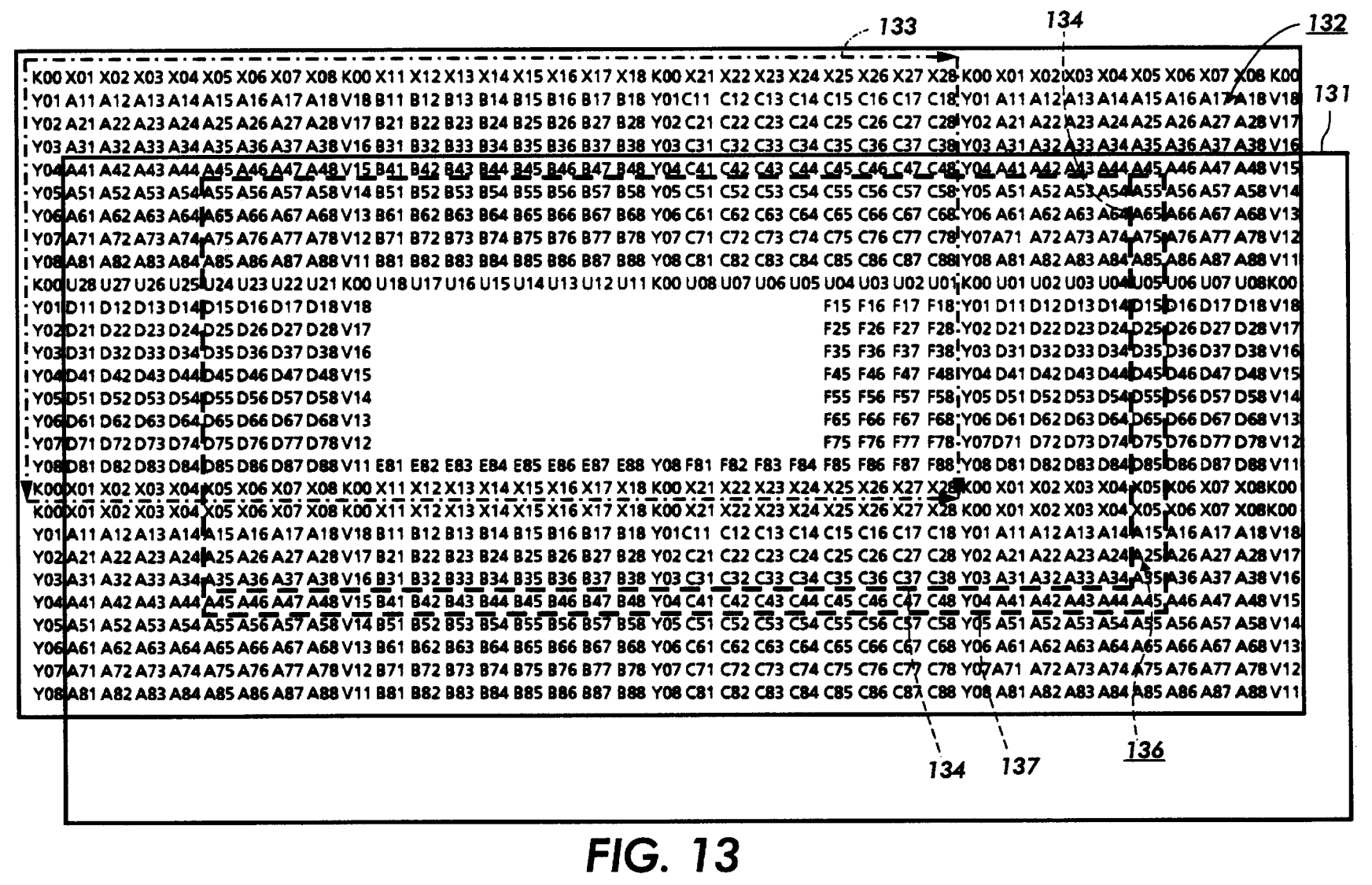

Still additional applications of this invention will suggest themselves. For example, as shown in FIG. 13, it can be employed to prevent the loss of data that is encoded in embedded data patterns that are written in close proximity to the edges of documents, such as in the margins. An appropriate tiling of such a data pattern will prevent data from being lost to the image vignetting that commonly occurs when such documents are scanned by flat bed scanners. See, for example, the misregistration of the capture window 131 with the tiled embedded data pattern 132 in FIG. 13. Also note that the "A", "B", "C", "D", "E" and "F" symbols represent glyph encodings of user data and the related EU, the "X", "U", "V" and "Y" symbols represent glyph encodings of PN sequences as described above, and the "K" symbols represent the glyph encodings of key code word and other information pertaining to the recovery of the user data. To further assist with the interpretation an embedded data block tile is outlined at 133, and a minimum capture window 134 that is extended to include a one glyph safety margin 136 is shown at 137. As will be appreciated, image vignetting is a type of image cropping. Thus, it will be evident that this invention can be even more generally applied to prevent embedded data from being lost due to cropping of the embedded data pattern, such as by light lens copying or by magnification.

Figure 14:
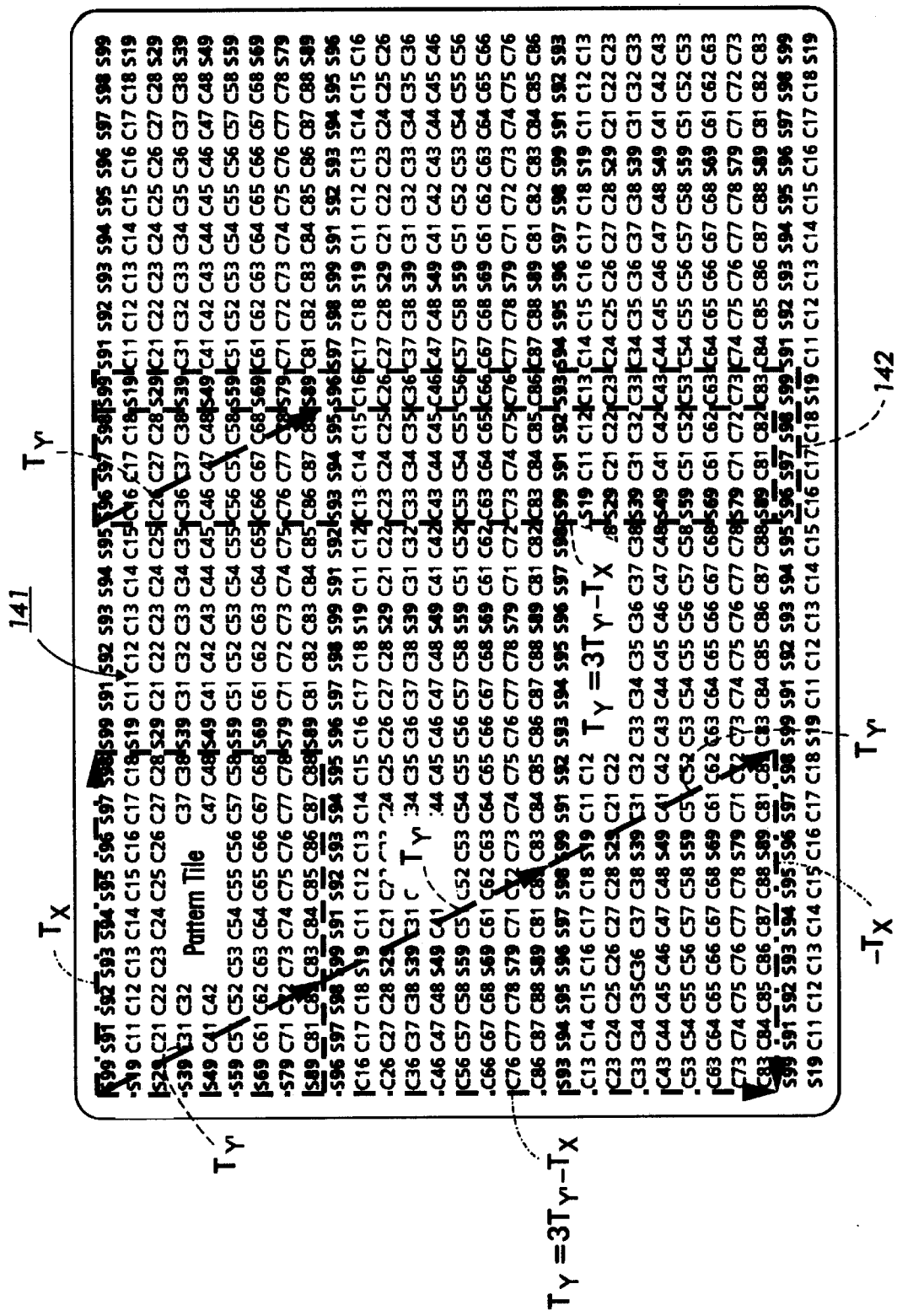
FIG. 14 illustrates shear tiling and related capture window design factors.

Referring to FIG. 14, this invention may also be extended to the writing and reading of shear tiled data patterns (i.e., data patterns that are tiled on non-orthogonal tiling vectors $T_x$ and $T_y$). As described in more detail hereinbelow, shear tiled embedded data patterns, such as the data pattern 141, permit advanced capture window design techniques to be utilized to maximum advantage for designing alternative capture windows, such as the capture window 142 in FIG. 15, to asynchronously capture embedded data from these data patterns. That, in turn, leads to significantly increased flexibility in designing and selecting capture windows for asynchronously capturing dual shear tiled data from more sophisticated data patterns. As will be observed, FIG. 14 employs a simplified symbology in which the glyph encoded user data and ECC are represented by the "C" symbols, while the data encoded by the glyphs on the data block framing lines are encoded by the "S" symbols (without any symbolic distinction between the different types of information that might be carried by these frame glyphs).

Figure 15:
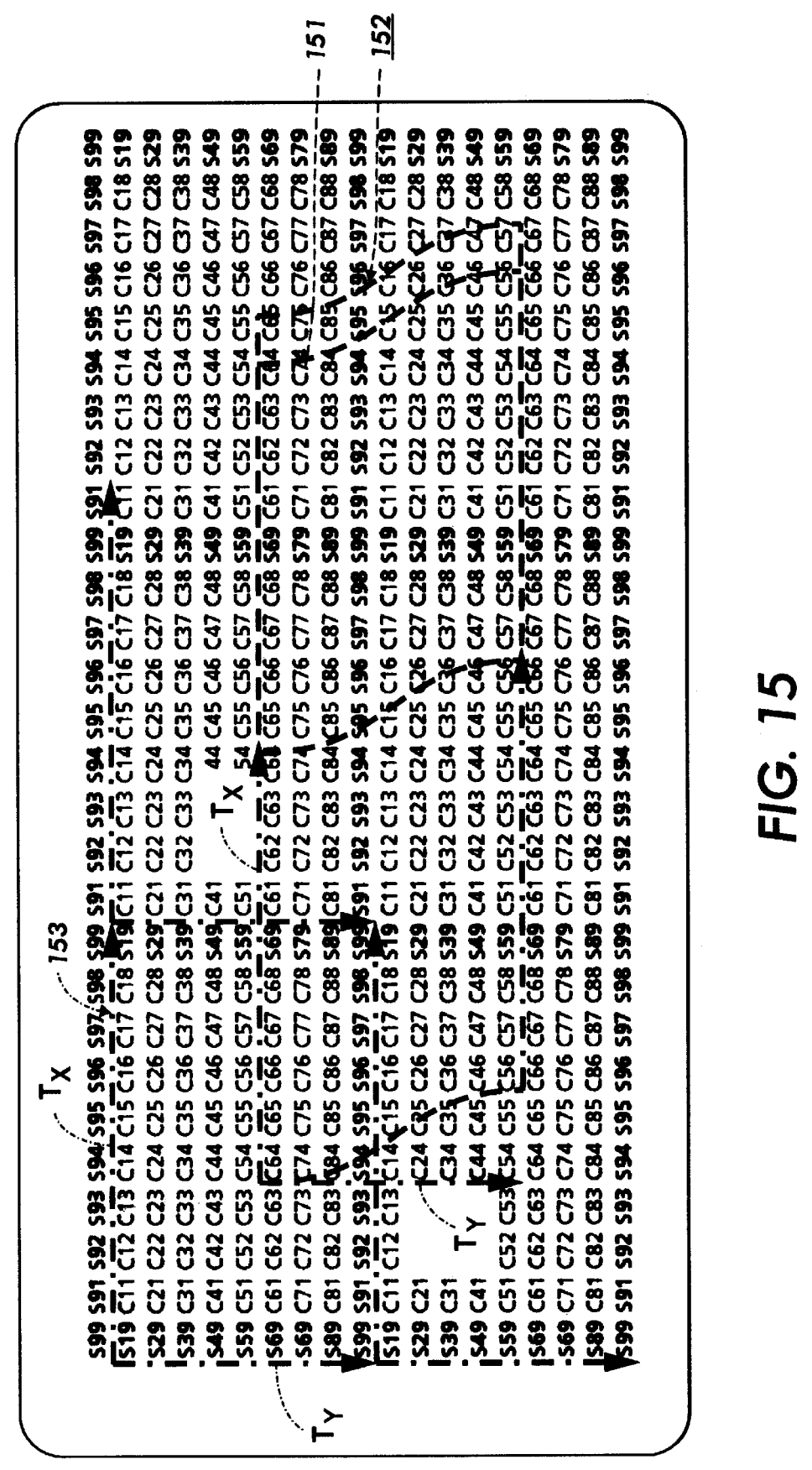

Focusing now on the design of capture windows for asynchronously capturing embedded data from tiled data patterns, it will be evident that these capture windows may be defined by raster scans, two dimensional swipe scans, or full window imaging. The standard prescription for the capture window is that it must include a shape (this shape must be fully registered with the embedded data pattern- i.e., within the intersection of the print and capture apertures) which is capable of tiling the recording medium (i.e., a plane) in accordance with the tiling vectors that are used for laying out the tiled data pattern from which data is to be extracted. This is a minimum prescription, so capture windows that span longer regions of the tiled data pattern can be employed. Moreover, as shown in FIG. 15, the capture window 151 may be configured, such as by a handswipe pattern, or the like to conform to a tile shape 152 that materially differs from the shape of the embedded pattern tiles 153. As indicated, it would even be possible to logically interpret a sinuous capture window view of the embedded data pattern in accordance with the sinuous shape of the capture window 151 when this capture window view in strongly referenced to an absolute address space (as previously described).

The above prescription for the capture window includes capture windows which include shapes that are capable of tiling the recording medium in accordance with any integer linear combination of the tiling vectors. See, for example, the alternate capture window configuration that is shown at 142 in FIG. 14.

Figure 16:
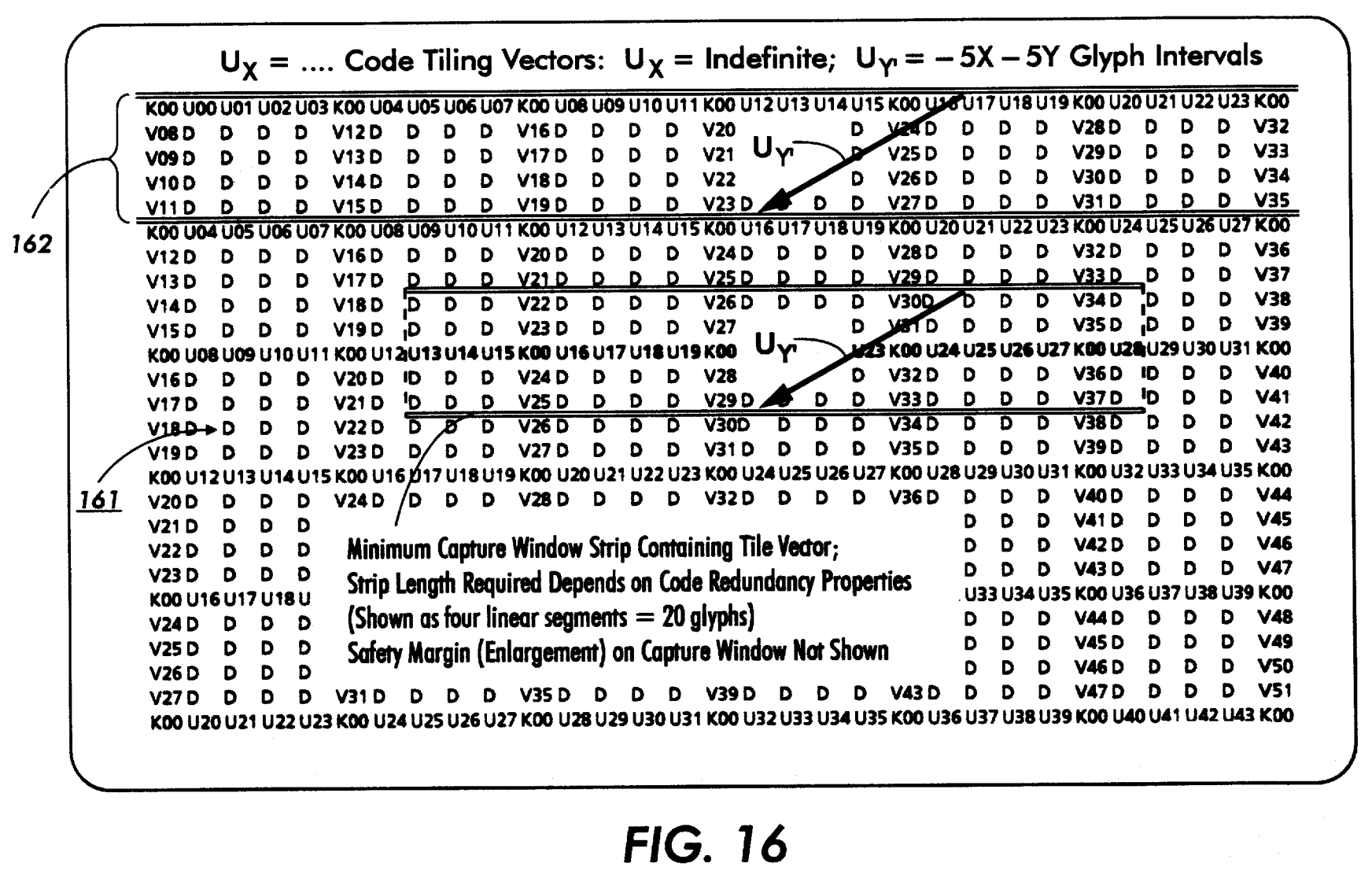

Unidirectionally tiled data patterns (i.e., those that are tile on just one tiling vector), such as shown at 161 in FIG. 15, introduce additional considerations for appropriate capture window design because they implicitly include a second non-parallel tiling vector of indefinite direction and magnitude. If desired, the capture window 162 for these unidirectionally tiled data patterns may be designed to provide a view of the embedded data pattern 161 over a region that is of sufficient length to extend across the data pattern and of sufficient width to include the tiling vector. Theoretically, this prescription applies, regardless of the angle between the longitudinal axis of this extended view of the embedded data pattern and the explicitly defined tiling vector. However, due to the finite size of the embedded data pattern, practical problems may be encountered when using capture windows that are oriented at small angles with respect to the explicit tiling vector. Thus, it is to be understood that the capture window for synchronously recovering data from these undirectionally tiled embedded data must not only include the explicitly defined tiling vector, but also must provide a view of all members of the embedded data pattern (i.e., a "full cover" of that pattern). As shown in FIGS. 16 and 17, this second constraint may sometimes permit the use of a capture window that only partially extends across the embedded data pattern because the redundancy of the data pattern axially of the explicitly defined tiling vector permit all unique members of the embedded data pattern a shorter capture window.

While studying the problems involved with employing a spatially asynchronous capture process for capturing ordered embedded data from a tiled embedded data code pattern f the above-described type, alternative techniques were identified for use in logically reconstructing tiled data blocks.

Figure 18:
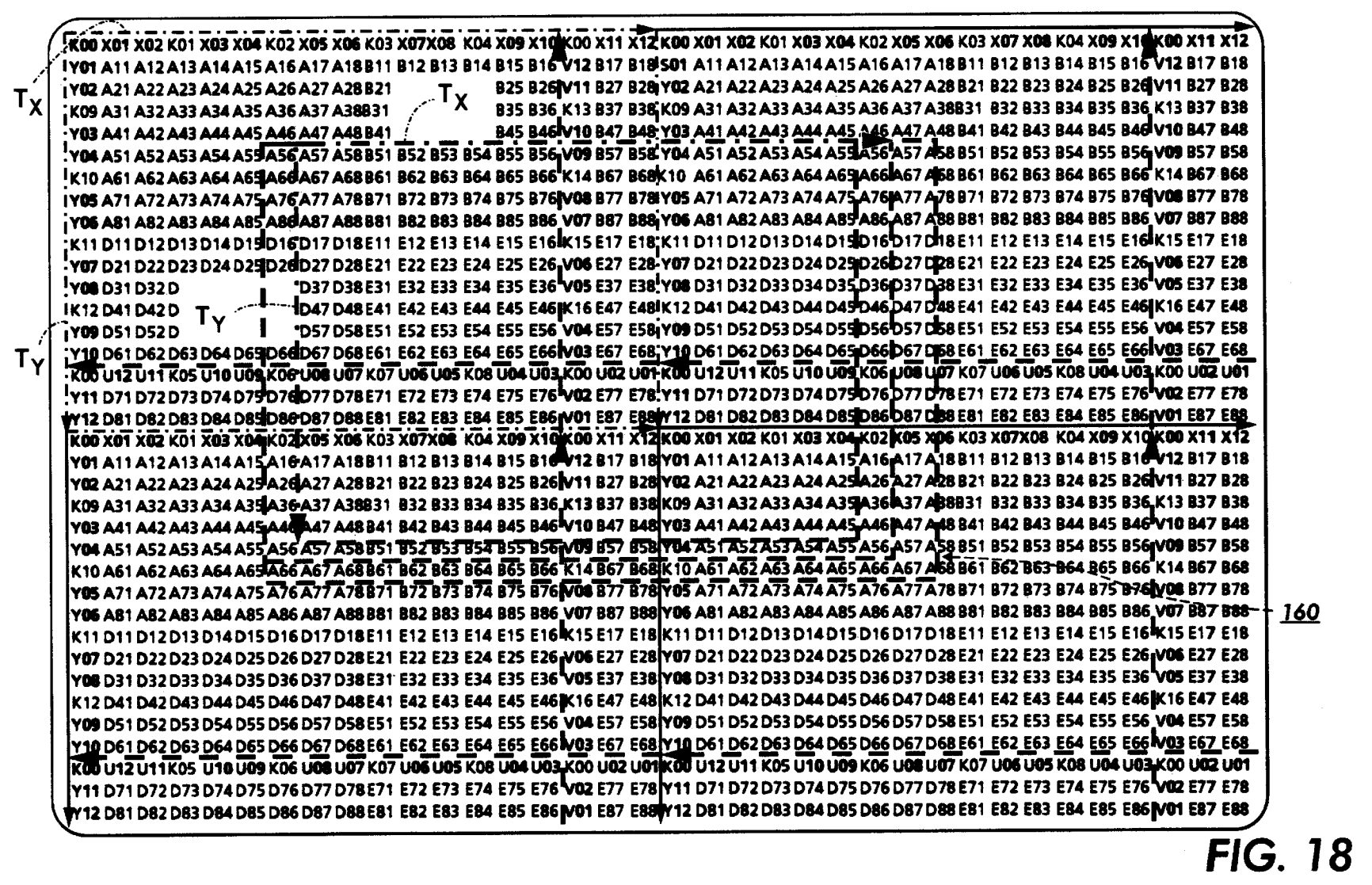
Figure 19:
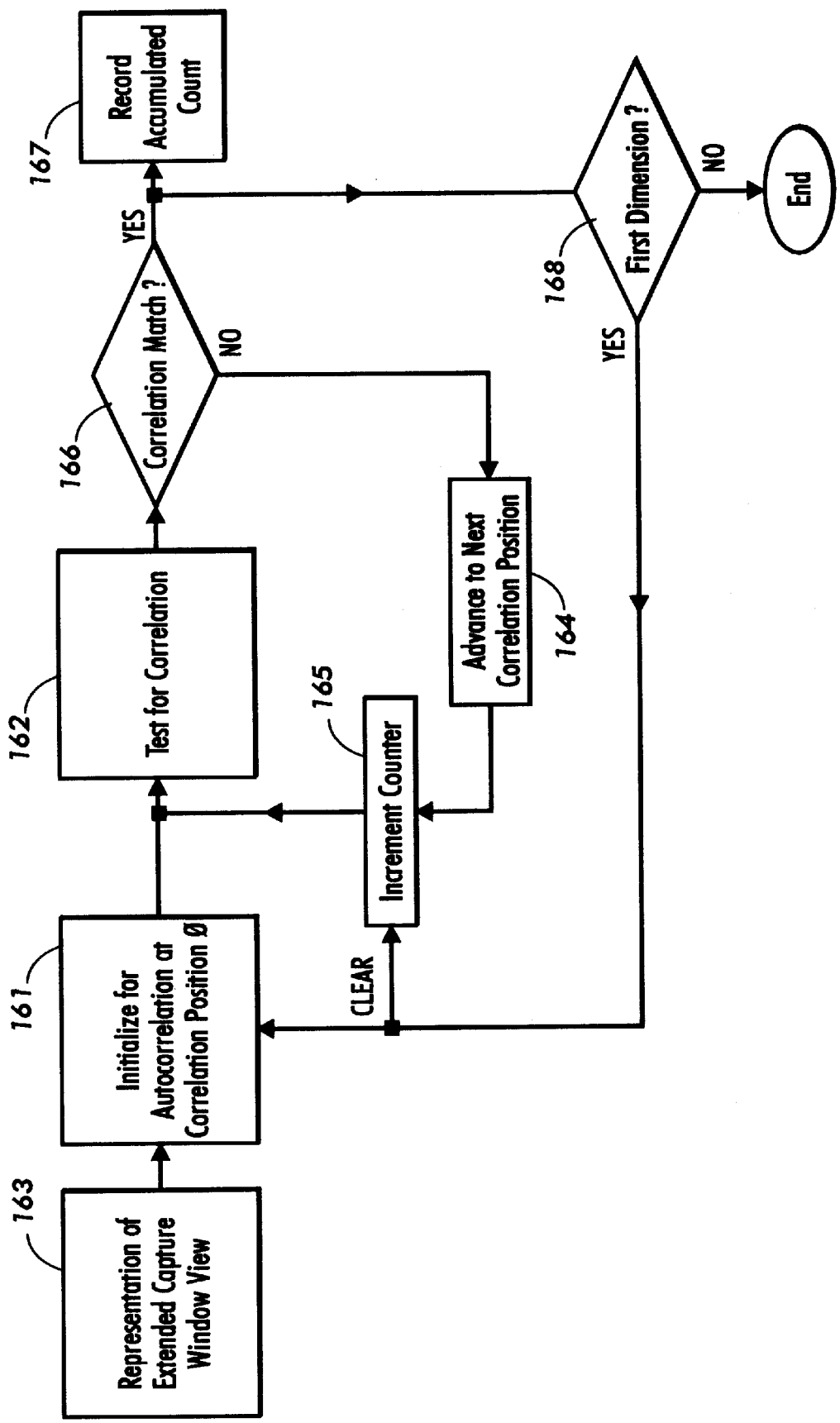
FIG. 19 diagrammatically illustrates a one dimensional autocorrelation process.

As shown in FIGS. 18 and 19, one of these techniques relies on a sliding window or step and repeat autocorrelation process for computing the dimensions (in a glyph count metric) of a rectangular data block which is tiled onto a recording medium by orthogonal tiling vectors. For a simple rectangular tiling, such as shown in FIG. 18, the dimensions of the data block can be determined by performing a one dimensional autocorrelation process, but a full two dimensional autocorrelation process is employed to perform these dimensional computations for non-rectangularly tiled data blocks. The additional information that is needed to carry out such an autocorrelation process is provided, at 160 in FIG. 18, by sizing the capture window view of the data pattern so that it not only satisfies the above-described minimum criterion (including any desired safety margin), but also includes one or two additional glyphs along both dimensions of the data block. If the tiled data block is guaranteed to contain at least a substantial number of glyphs, (e.g., sixteen or so) along both of its dimensions and if the data that is encoded by those glyphs essentially is random, an autocorrelation match on one row or column of data code would be sufficient to confirm the dimensional computation to a suitable level of confidence. However, matches over two or even more rows and columns are preferred to confirm dimensional computations when dealing with data blocks that can be small or that include redundant encodings, such are represented by the code symbols "K", "X", "U", "V" and "Y" in FIG. 18 (the symbols "A", "B", "D" and "E" represent data and ECC encodings, which typically are random).

FIG. 19 illustrates a relatively straightforward one dimensional autocorrelation process that might be used for performing the dimensional computations. This process is initialized at 161 to test at 162 for autocorrelation with a copy of the extended pixel map or binary representation of the capture window view 163 of the data pattern fully registered with that representation in a neutral position 0. The process then cycles on an inner loop, as at 164, to re-test at 162 for correlation as the copy of the capture representation window 163 is incrementally shifted row-by-row or column-by-column across that representation. The count accumulated by a counter 165 is incremented as the process recycles to maintain a running count corresponding to the number of rows or columns the copy of the capture window representation 163 has been shifted. Thus, when a correlation match is detected at 166, the count accumulated by the counter 165 is recorded at 167 to identify the first dimension of the data block in a glyph count metric. This process then is repeated as indicated by the outer loop, as at 168, to compute the other dimension of the data block.

Image autocorrelation might be employed to carry out these block size computations on the pixel map representation of the capture window view, but logical autocorrelation is more reliable because the binary representation is distortion-free.

As will be appreciated, once the capture window view of the data pattern has been referenced to any point or set of points that reside at predefined locations (i.e., absolute addresses) in the data block, the data block can be reconstructed by using the self-clocking property of the glyphs, provided that the dimensions of the data block are known or have been computed in a glyph count metric. The referencing of the capture window view of the data pattern to logical absolute address space provides a strong spatial reference for the data block. However, other techniques can be employed to provide this spatial referencing, including providing recognizable code sequences for identifying the corners of the data block and including recognizable fiduciary marks to identify specific locations within the data block.

Figure 20:
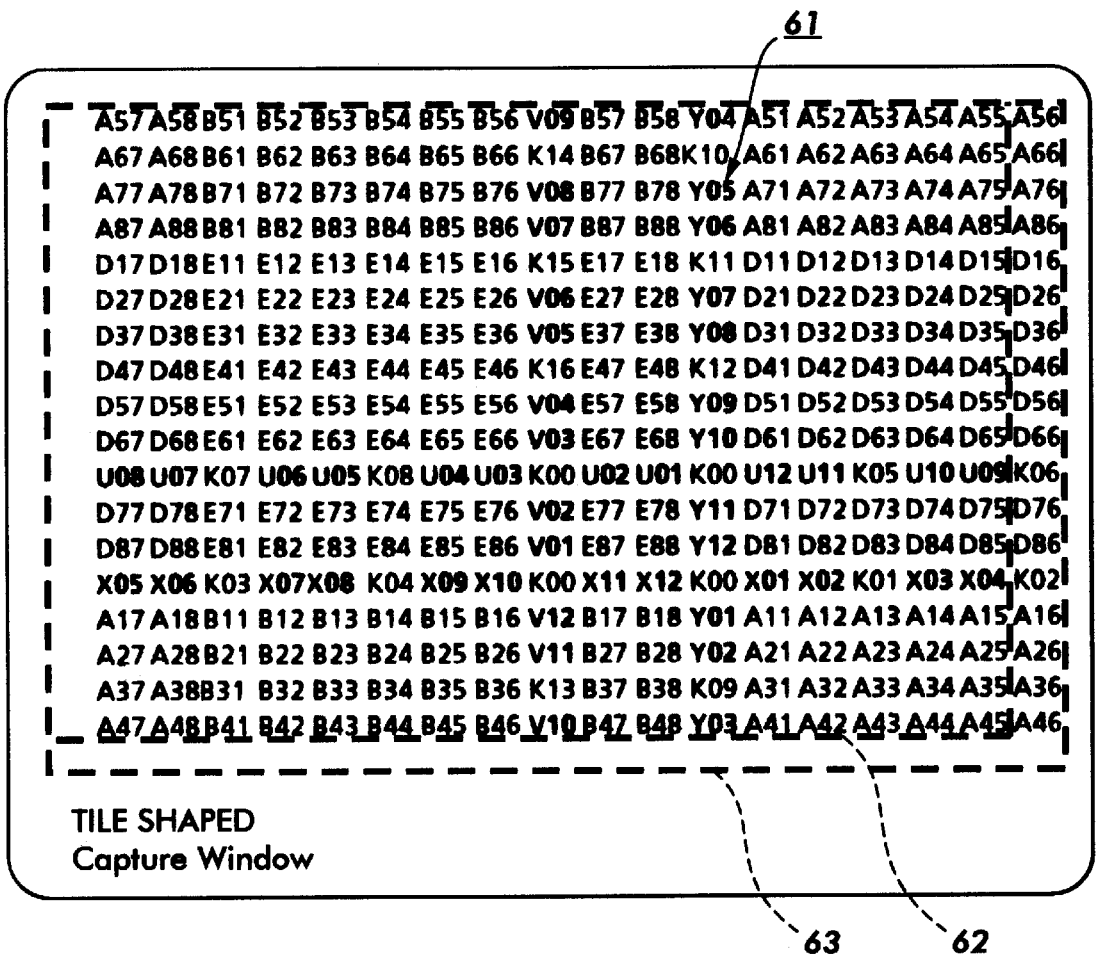
FIG. 20 illustrates a capture window view of an embedded data pattern.
Figure 21:
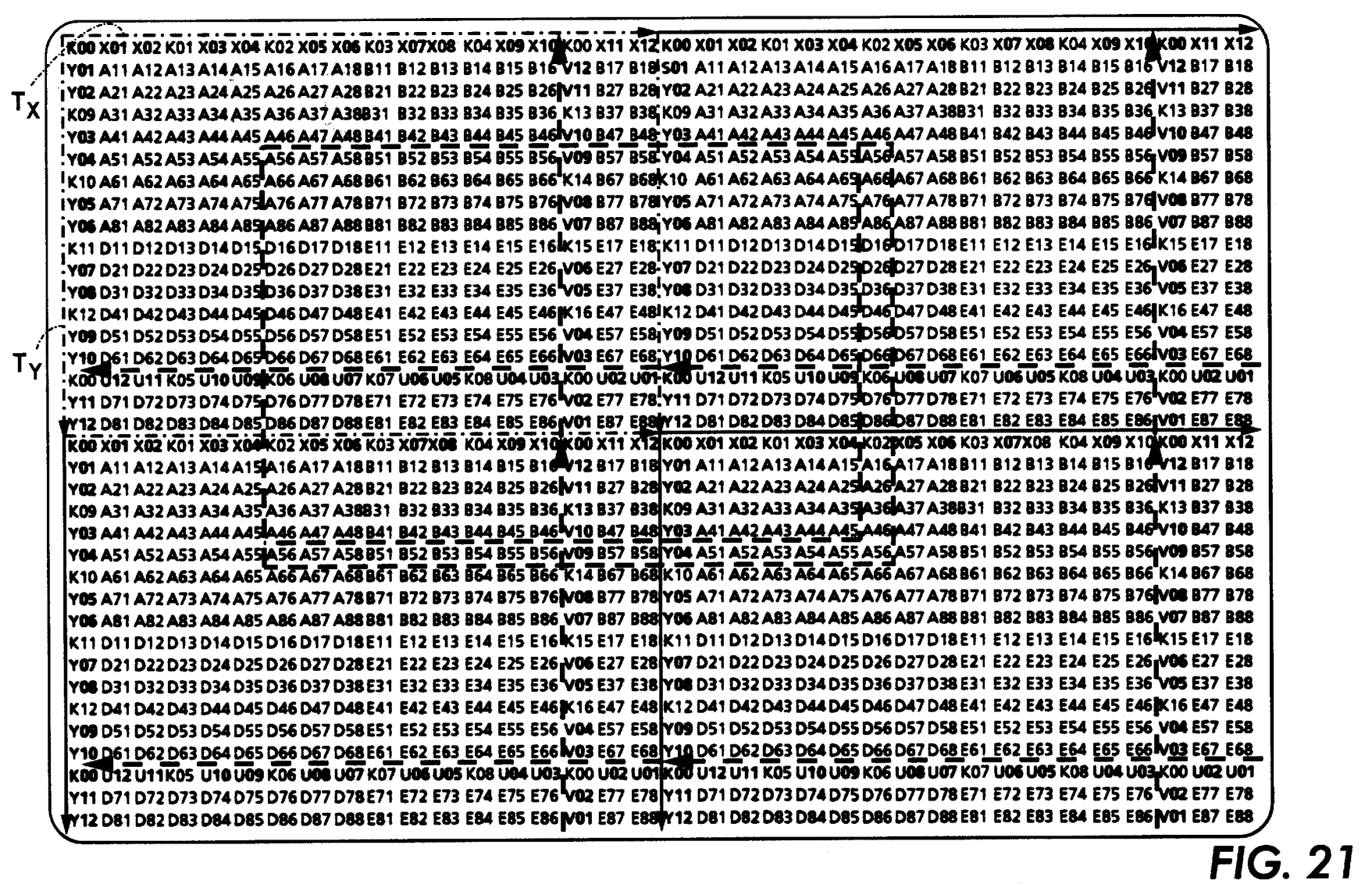

There may be some cases where the tiling vectors that are used to layout the embedded data pattern are known or determinable without first reconstructing the data block. In those cases, the known tiling vectors $T_x$ and $T_y$ can be employed to perform a glyph-by-glyph expansion on the capture window view of the embedded data pattern (FIG. 20) to provided an expanded representation (FIG. 21) which includes one or more complete and logically organized representations of the data block. As will be understood the expansion process is a straightforward vector mapping of one or more copies of the capture window view of the embedded data. Of course, once a spatial reference is established for any one of these logically organized data blocks and the data block dimensions have been determined, a suitable decoding process can be employed as at 106 (FIG. 10) to recover the embedded data from the data block.

Figure 22:
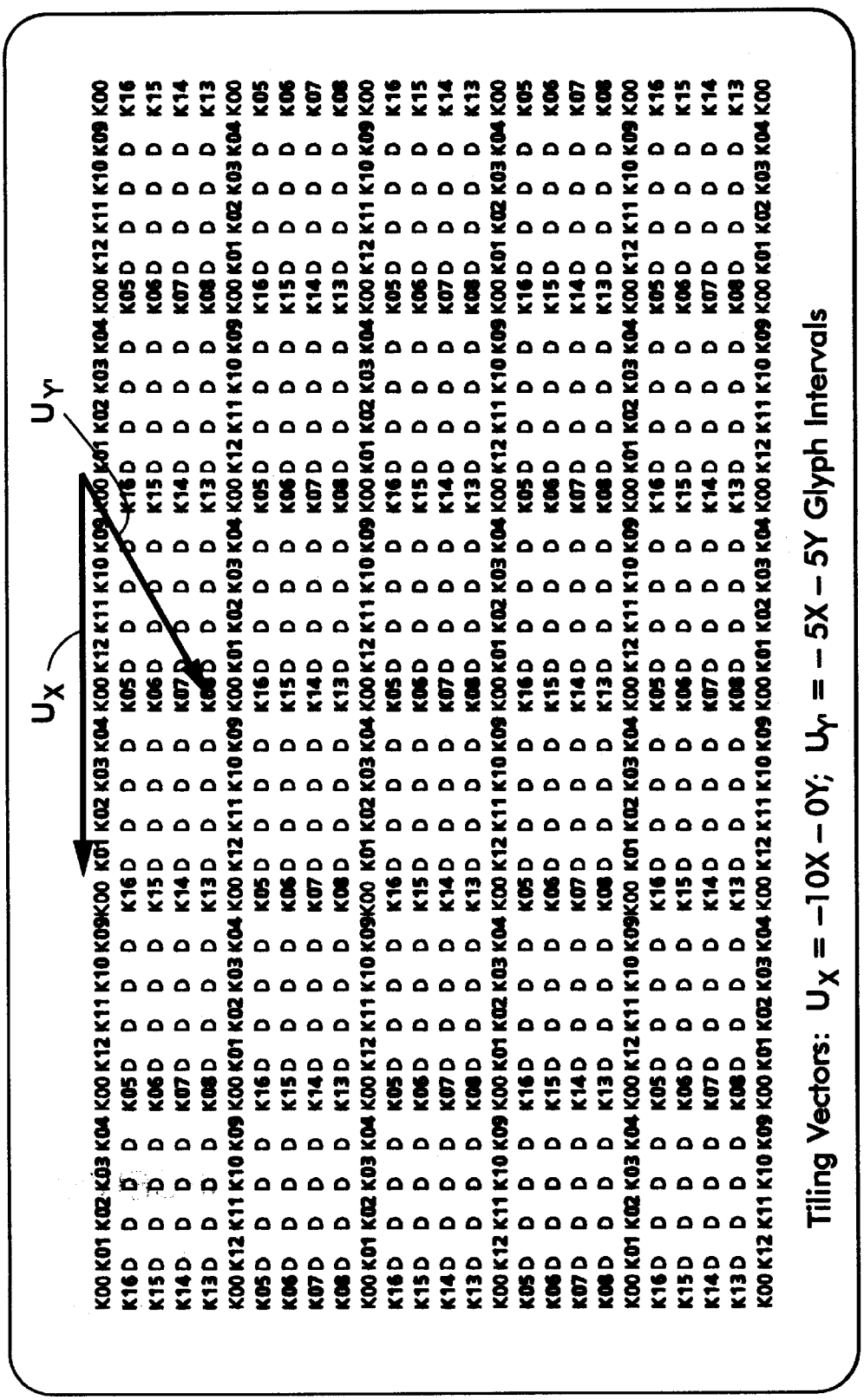
FIG. 22 illustrates a subperiodic shear tiling.

Single cycle (untiled) and multi-cycle (tiled) embedded data code patterns often include subperiodic tilings of one or more selected code patterns. The subperiodically tiled code often contains information that is needed for correct processing of the code pattern or correct processing of the data that is embedded therein during data recovery operations. For example, as shown in a simplified compressed format in FIG. 22 by the "K" symbols, the embedded data blocks described in the above referenced Petrie patent application contain a shear tiling of an ECC protected key codeword encoding which encodes the size, in bytes, of the error correction codes (ECCs) in the EDB and the number of 0 errors (within a range of −127) that can be corrected by these ECCs. This key codeword data is tiled into the EDB, by using a tiling that permits the key codeword and its ECC to be recovered in correct logical order when reading any of the frames of the EDB.

Figure 23:
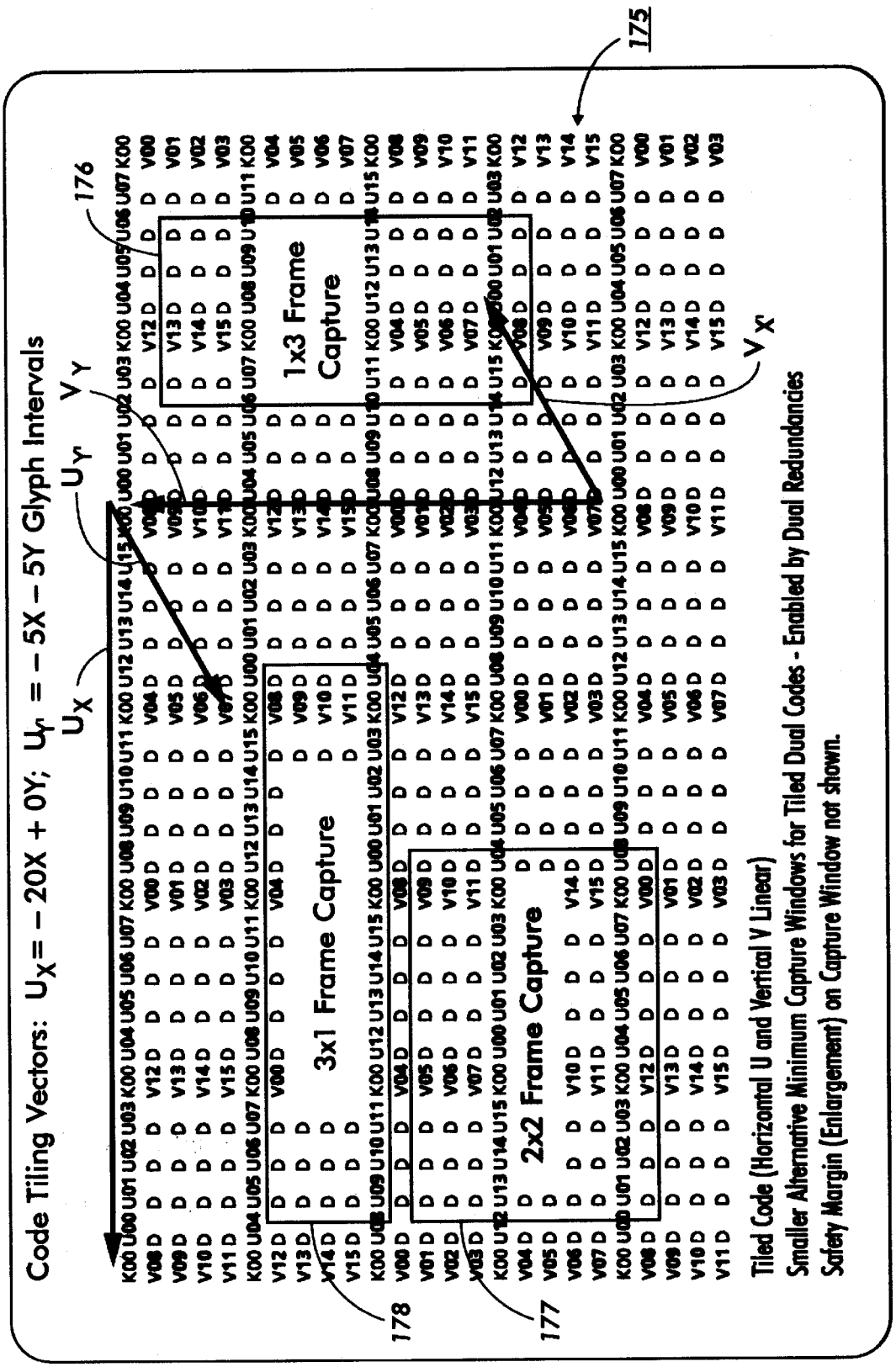
FIG. 23 illustrates subperiodic shearing tilings of a pair of code patterns.

Referring to FIG. 23, it will be seen that a pair of linear, nonintersecting, subperiodic code patterns "U" and "V" can be sheared tiled into a tiled or untiled (as shown) embedded data pattern 175 by different sets of tiling vectors, $U_x$, $U_y$ and $V_x$, $V_y$, respectively. As indicated at 176–178, all of the foregoing teachings concerning the capture of shear tiled embedded data patterns relate to these shear tiled patterns. However, it is to be noted that the shear tiled patterns "U" and "V" are spatially referenced to the spatial reference or references that are established for the data pattern in which they are tiled.

Figure 24:
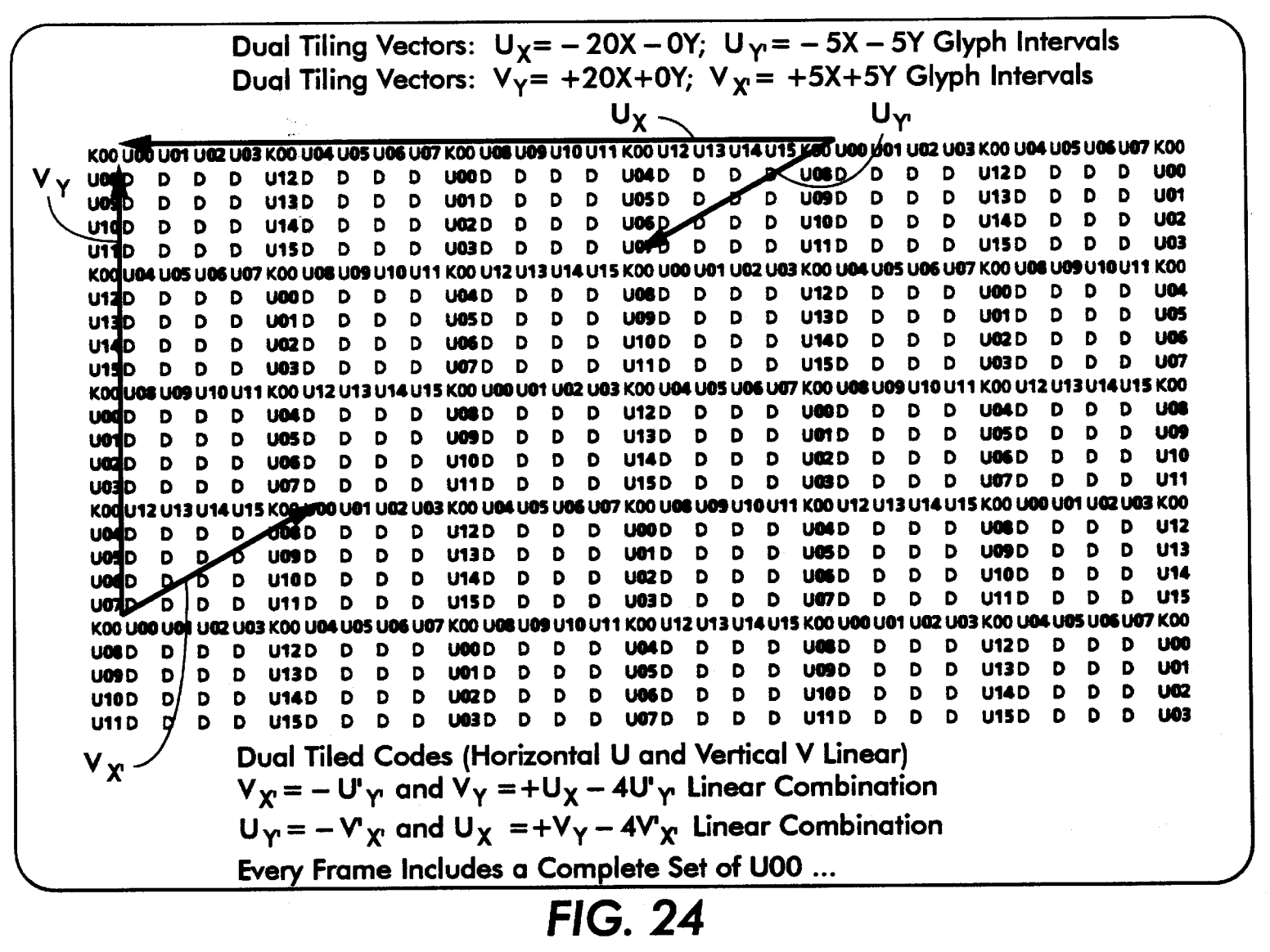

As shown in FIG. 24, it has been found that dual shear tilings of linear, horizontally and vertically oriented, nonintersecting code patterns can be employed to layout multiple, logically ordered, interlaced encodings of at least a few bytes of information, such as key codeword information, in a tiled or untiled embedded data pattern in accordance with a variety of different layout geometries. For example, FIG. 24 shows logically ordered, vertically and horizontally oriented encodings of a code U which are interlaced with logically ordered, square layouts of the same code U. To map these logically organized, interlaced representations of the code U into the data pattern, corner symbols "K" are interlaced with the code U at a frequency which is selected to distribute these corner symbols K to the intersections between the horizontally and vertically oriented encodings of the code U in the data pattern. The code U and these interlaced corner symbols then are shear tiled into the data pattern by using two different pairs of shear tiling vectors $U_x$, $U_y$, and $V_y$, $V_x$. As will be seen, the tiling vectors $U_x$ and $V_y$ are orthogonal with each other to align with the horizontal and vertical axes, respectively, of the data pattern. The lengths of these two vectors is equal (in a glyph count metric) to the combine length of the code U and the interlaced corner glyphs K. The other two vectors, $U_{x'}$ and $V_{y'}$ are in parallel, oppositely oriented alignment, and they both have a length that is equal (again in a glyph count metric) to an integer linear vector sum of any two sides of a square (i.e., four equal segment) layout of the code U.

What is claimed is:

1. A process for encoding digital information into a plurality of essentially identical machine readable shear tiled embedded data blocks, said process comprising the steps of encoding said digital information in accordance with a machine recognizable symbolic representation;

selecting at least one pair of shear tiling vectors;

laying out said shear tiled embedded data blocks in accordance with said shear tiling vectors; and shear tiling said symbolic representation into said shear tiled embedded data blocks in accordance with said shear tiling vectors.

2. The process of of claim 1 wherein said tiled data blocks comprise a self-clocking glyph code.

3. The process of claim 2 wherein said glyph code is composed of marks that are oriented at significantly different angles to encode different digital values.

4. The process of claim 3 wherein said marks are oriented at +45° and −45°, respectively, with respect to a predetermined axis for encoding binary 1's and 0's, respectively.

5. A process for redundantly encoding digital framing codes in a machine readable embedded data pattern, said process comprising the steps of:

encoding said digital framing codes in accordance with a machine recognizable symbolic representation; and selecting at least two pairs of shear tiling vectors to map a plurality of logically organized, interlaced, machine readable representations of said digital framing codes into said data patterns in accordance with a plurality of different layout geometries.

6. The process of claim 5 wherein said tiled data pattern is a self-clocking glyph code.

7. The process of claim 6 wherein said glyph code is composed of marks that are oriented at significantly different angles to encode different digital values.

8. The process of claim 7 wherein said marks are oriented at +45φ and −45φ, respectively, with respect to a predetermined axis for encoding binary 1's and 0's, respectively.

9. A process for recording a machine readable encoding of logically ordered digital values on a recording medium for a spatially asynchronous readout of said encoding from said recording medium; said encoding being composed of machine recognizable symbols which are selected to encode respective ones of said digital values and ordered to preserve the logical ordering of said values; said process comprising the steps of:

writing multiple, essentially identical copies of said encoding and corresponding machine recognizable spatial synchronization indicia onto said recording medium to provide multiple spatially synchronizeable instances of said encoding; and laying out said spatially synchronizeable instances of said encoding, during said writing, on a spatially periodic lattice of centers on said recording medium in accordance with a layout rule; said layout rule spatially formatting the respective instances of said encoding uniformly while mapping said instances of said encoding into respective two dimensional, non-overlapping data blocks which are tiled on to said recording medium in at least one direction in accordance with a fixed length tiling vector to record a tiled data pattern on said recording medium;

whereby a read out of said tiled data pattern over an area spanning any number of recorded instances of said encoding with a profile covering a shape that is configured to tile said data blocks on to said recording medium in accordance with said tiling vector provides sufficient information for accurately interpreting said encoding.

10. The process of claim 9 wherein said spatial synchronization indicia are composed of machine recognizable sequences of symbols which are visually indistinguishable from the symbols that encode said digital values.

11. The process of claim 10 wherein said lattice of centers is rectangular, said data blocks are rectangular and are rectangularly oriented to align widthwise and lengthwise with rows and columns of said lattice of centers, and said data blocks are of deterministic symbol size widthwise and lengthwise.

12. The process of claim 11 wherein said symbols are angularly oriented slash-like marks, and said digital values and said spatial synchronization sequences are encoded in the angular orientations of said marks.

13. The process of claim 12 wherein said digital values and said spatial synchronization sequences are binary, and said slash-like marks are angularly oriented at approximately +45° and −45° with respect to the rows and columns of said centers to encode binary 1's and 0's.

14. The process of claim 12 wherein said data blocks are written on spatially contiguous sets of said centers.

15. The process of claim 14 wherein said digital values and said spatial synchronization sequences are binary, and said slash-like marks are angularly oriented at approximately +45° and −45° with respect to the rows and columns of said centers to encode binary 1's and 0's.

16. A process for recording a machine readable encoding of logically ordered digital values on a recording medium for a spatially asynchronous readout of said encoding from said recording medium; said encoding being composed of machine recognizable symbols which are selected to encode respective ones of said digital values and ordered to preserve the logical order of said digital values; said process comprising the steps of:

writing multiple, essentially identical copies of said encoding and corresponding machine recognizable spatial synchronization indiria onto said recording medium to provide multiple spatially synchronizeable instances of said encoding; and performing said writing in accordance with a layout rule that is selected to write said instances of said encoding on a spatially periodic lattice of centers on said recording medium;

said instances of said encoding being uniformly spatially for-matted on said recording medium under said layout rule while being mapped, pursuant to said layout rule, into respective, two dimensional, non-overlapping data blocks; said data blocks being tiled on to said recording medium, under said layout rule, in accordance with a pair of fixed length, angularly separated tiling vectors to record said instances of said encoding in a tiled data pattern;

whereby a readout of said tiled data pattern over an area that includes a region of said tiled data pattern that is appropriately shaped for tiling a plane in accordance with said tiling vectors provides sufficient information for accurately interpreting said encoding, regardless of where said area is located with respect to said data pattern.

17. The process of claim 16 wherein said spatial synchronization indicia are composed of machine recognizable sequences of symbols which are visually indistinguishable from the symbols that encode said digital values.

18. The process of claim 17 wherein said lattice of centers is rectangular, said data blocks are rectangular and are oriented to align widthwise and lengthwise with rows and columns of said lattice of centers, and said data blocks are of deterministic symbol size widthwise and lengthwise.

19. The process of claim 18 wherein said symbols are elongated slash-like marks which encode said digital values and said spatial synchronization sequences in their angular orientations.

20. The process of claim 19 wherein said digital values and said spatial synchronization sequences are binary, and said slash-like marks are angularly oriented at approximately +45° and −45° with respect to the rows and columns of said centers to encode binary 1's and 0's.

21. The process of claim 18 wherein said data blocks are written on spatially contiguous sets of said centers.

22. The process of claim 21 wherein said digital values and said spatial synchronization sequences are binary, and said slash-like marks are angularly oriented at approximately +45° and −45° with respect to the rows and columns of said centers to encode binary 1's and 0's.

23. An image capture mechanism for asynchronously reading out encoded data from a tiled embedded data pattern, said data pattern being composed of multiple, essentially identical copies of an embedded data block which are tiled onto a recording medium in at least one direction in accordance with a fixed length tiling vector, each said embedded data block comprising at least one spatial reference point residing at a predefined location; said image capture mechanism comprising:

a capture window which is registered with a portion of said data pattern, said capture window being configured to include a shape which is registered fully with said data pattern and which is capable of tiling said data block onto said recording medium in accordance with said tiling vector, said capture window registered portion of said data pattern being referenced to said at least one spatial reference point.

24. An image capture mechanism for reading out a tiled embedded data pattern, said data pattern being composed of multiple, essentially identical copies of an embedded data block which are tiled onto a recording medium in accordance with a pair of angularly separated fixed length tiling vectors, each said embedded data block comprising at least one spatial reference point residing at a predefined location; said image capture mechanism comprising:

a capture window which is asynchronously registered with a portion of said data pattern, said capture window being configured to include a shape that is capable of tiling said recording medium in accordance with said tiling vectors, said capture window registered portion of said data pattern being referenced to said at least one spatial reference point.

25. The image capture mechanism of claim 24 wherein one of said tiling vectors is oriented at an acute angle with respect to the other of said tiling vectors to shear tile said data block onto said recording medium.

26. The image capture mechanism of claim 25 wherein said shape conforms to an integer linear combination of said tiling vectors.

27. A process for logically ordering a spatially asynchronous read out of an encoding of logically ordered digital values which is written on a recording medium as a tiled data pattern that is composed of multiple spatially synchronizeable instances of said encoding; said encoding being composed of machine recognizable symbols which are selected to encode respective ones of said digital values and ordered to preserve the logical ordering of said values; said spatially synchronizeable instances of said encoding further including machine recognizable spatial synchronization indicia which are written into predetermined positions within each of said instances of said encoding; said instances of said encoding being written on a spatially periodic lattice of centers on said recording medium and being mapped in to, and identically spatially formatted within, respective essentially identical, two dimensional, non-overlapping data blocks which are tiled on to said recording medium in at least one direction in accordance with a fixed length tiling vector; said read out covering an area of said tiled data pattern over an included region that is appropriately shaped for tiling said data blocks on to said recording medium in accordance with said tiling vector; said process comprising the steps of:

transforming the read out of said encoding into a correspondingly ordered, two dimensional representation of the digital values encoded by the symbols and of the spatial synchronization indicia contained by said read out;

performing a correlation test on said representation to identify a full cover for a spatially synchronizeable instance of said encoding, independently of the spatial formatting of the instance of said encoding that is contained by said cover;

locating the spatial synchronization indicia within said cover to establish a spatial reference for said cover; and reading out the spatially referenced cover in an order that corresponds to the spatial formatting of said data blocks, thereby conforming the order of said read out to the logical order of the encoded values.

28. The process of claim 27 wherein
said spatial synchronization indicia are spatially ordered sets of symbols which encode a machine recognizable digital synchronization sequence and which are visually indistinguishable from the symbols that encode said digital values.

29. The process of claim 28 wherein said data blocks are rectangular and are of deterministic symbol size independently of said correlation test; and said correlation test is performed along one dimension of said representation to identify said cover.

30. The process of claim 29 wherein said symbols are slash-like marks which encode said digital values and said synchronization sequences in their angular orientations.

31. The process of claim 30 wherein said digital values and said synchronization sequences are binary, and said slash-like marks are oriented at approximately +45° and −45° with respect to an axis to encode binary 1's and 0's.

32. The process of claim 31 wherein said data blocks are written on spatially contiguous sets of said centers.

33. The process of claim 28 wherein said data blocks are rectangular; and said correlation test is performed along both dimensions of said representation to identify said cover.

34. The process of claim 33 wherein said symbols are slash-like marks which encode said digital values and said synchronization sequences in their angular orientations.

35. The process of claim 24 wherein said digital values and said synchronization sequences are binary, and said slash-like marks are oriented at approximately +45° and −45° with respect to an axis to encode binary 1's and 0's.

36. The process of claim 35 wherein said data blocks are written on spatially contiguous sets of said centers.

37. A process for logically ordering a spatially asynchronous read out of an encoding of logically ordered digital values which is written on a recording medium as a tiled data pattern that is composed of multiple spatially synchronizeable instances of said encoding; said encoding being composed of machine recognizable symbols which are selected to encode respective ones of said digital values and ordered to preserve the logical ordering of said values; said spatially synchronizeable instances of said encoding further including machine recognizable synchronization indicia which are written into predetermined positions within each of said instances of said encoding, said instances of said encoding being written on a spatially periodic lattice of centers on said recording medium and being mapped in to, and identically spatially formatted within, respective essentially identical, two dimensional, non-overlapping data blocks which are tiled on to said recording medium in accordance with a pair of fixed length, angularly separated tiling vectors; said read out covering an area of said tiled data pattern over an included region that is appropriately shaped for tiling said recording medium in accordance with said tiling vectors; said process comprising the steps of:

transforming the read out of said encoding into a correspondingly ordered, two dimensional representation of the digital values encoded by the symbols and of the synchronization indicia contained by said read out; and performing a correlation test on said representation to identify a full cover for a spatially synchronizeable instance of said encoding, independently of the spatial formatting of the instance of said encoding that is contained by said cover.

38. The process of claim 37 wherein said spatial synchronization indicia are spatially ordered sets of symbols which encode a machine recognizable digital synchronization sequence and which are visually indistinguishable from the symbols that encode said digital values.

39. The process of claim 38 wherein said data blocks are rectangular and are of deterministic symbol size independently of said correlation test; and said correlation test is performed along one dimension of said representation to identify said cover.

40. The process of claim 39 wherein said symbols are slash-like marks which encode said digital values and said synchronization sequences in their angular orientations.

41. The process of claim 40 wherein said digital values and said synchronization sequences are binary, and said slash-like marks are oriented at approximately +45° and −45° with respect to an axis to encode binary 1's and 0's.

42. The process of claim 41 wherein said data blocks are written on spatially contiguous sets of said centers.

43. The process of claim 38 wherein said data blocks are rectangular and are of deterministic symbol size; and said correlation test is performed along both dimensions of said representation to identity said cover.

44. The process of claim 43 wherein said symbols are slash-like marks which encode said digital values and said synchronization sequences in their angular orientations.

45. The process of claim 44 wherein said digital values and said synchronization sequences are binary, and said slash-like marks are oriented at approximately +45° and −45° with respect to an axis to encode binary 1's and 0's.

46. The process of claim 45 wherein said data blocks are written on spatially contiguous sets of said centers.

* * * * *

UNITED STATES PATENT AND TRADEMARK OFFICE
CERTIFICATE OF CORRECTION

PATENT NO. : 6,000,621
DATED : December 14, 1999
INVENTOR(S) : David L. Hecht and Glen W. Petrie It is certified that error appears in the above-identified patent and that said Letters Patent is hereby corrected as shown below:

In the title presently reading:

"TILINGS OF MONO-CODE AND DUAL-CODE EMBEDDED DATA PATTERN STRIPS FOR ROBUST ASYNCHRONOUS CAPTURE" should read --LAYING OUT AND CAPTURE OF TILED EMBEDDED DATA PATTERNS--

Signed and Sealed this

Seventeenth Day of July, 2001

*Attest:*

NICHOLAS P. GODICI
*Attesting Officer*   Acting Director of the United States Patent and Trademark Office